(12) United States Patent
Park et al.

(10) Patent No.: US 11,356,998 B2
(45) Date of Patent: Jun. 7, 2022

(54) METHOD AND DEVICE FOR WIRELESS SIGNAL TRANSMISSION OR RECEPTION IN WIRELESS COMMUNICATION SYSTEM

(71) Applicant: LG Electronics Inc., Seoul (KR)

(72) Inventors: Changhwan Park, Seoul (KR);
Seokmin Shin, Seoul (KR); Joonkui Ahn, Seoul (KR); Suckchel Yang, Seoul (KR); Seunggye Hwang, Seoul (KR)

(73) Assignee: LG Electronics Inc., Seoul (KR)

(*) Notice: Subject to any disclaimer, the term of this patent is extended or adjusted under 35 U.S.C. 154(b) by 88 days.

(21) Appl. No.: 17/018,342

(22) Filed: Sep. 11, 2020

(65) Prior Publication Data
US 2020/0413384 A1    Dec. 31, 2020

Related U.S. Application Data

(63) Continuation of application No. 16/786,624, filed on Feb. 10, 2020, now Pat. No. 10,779,272, which is a
(Continued)

(30) Foreign Application Priority Data

Apr. 30, 2018 (KR) .................. 10-2018-0050204
May 10, 2018 (KR) .................. 10-2018-0053607
May 18, 2018 (KR) .................. 10-2018-0056995

(51) Int. Cl.
*H04W 72/04* (2009.01)
*H04L 1/18* (2006.01)
*H04L 5/14* (2006.01)

(52) U.S. Cl.
CPC ......... *H04W 72/042* (2013.01); *H04L 1/1812* (2013.01); *H04L 5/14* (2013.01); *H04W 72/0446* (2013.01)

(58) Field of Classification Search
CPC .......... H04W 72/042; H04W 72/0446; H04W 72/1263; H04W 72/1278; H04L 1/1812;
(Continued)

(56) References Cited

U.S. PATENT DOCUMENTS

2017/0230961 A1    8/2017   Park et al.
2018/0048444 A1*   2/2018   Park .................. H04L 5/0048
(Continued)

FOREIGN PATENT DOCUMENTS

CN    108141341    6/2018
CN    108352932    7/2018
(Continued)

OTHER PUBLICATIONS

LG Electronics, "Discussion on common aspects in TDD NB-IoT," R1-1806597, 3GPP TSG RAN WG1 Meeting #93, Busan, Korea, dated May 21-25, 2018, 7 pages.
(Continued)

*Primary Examiner* — Kyaw Z Soe
(74) *Attorney, Agent, or Firm* — Fish & Richardson P.C.

(57) ABSTRACT

The present invention relates to a wireless communication system and, specifically, to a method comprising the steps of: repeatedly transmitting a PUSCH; and repeatedly receiving the PDSCH in a DL duration immediately following after repeated transmission of the PDSCH, wherein when a terminal operates in an in-band mode, each PDSCH is received from an OFDM symbol subsequent to a k-th OFDM symbol in each corresponding time unit within the DL duration (k>1), and in the case where the terminal operates in a guard-band mode or a stand-alone mode, signal reception is skipped at a starting portion of the DL duration when the PDSCH is repeatedly received.

14 Claims, 16 Drawing Sheets

Related U.S. Application Data continuation of application No. PCT/KR2018/009187, filed on Aug. 10, 2018.

(60) Provisional application No. 62/662,204, filed on Apr. 24, 2018, provisional application No. 62/591,137, filed on Nov. 27, 2017, provisional application No. 62/586,208, filed on Nov. 15, 2017, provisional application No. 62/543,928, filed on Aug. 10, 2017.

(58) Field of Classification Search
CPC ....... H04L 5/14; H04L 1/1664; H04L 1/1854; H04L 5/006; H04L 5/1469; H04L 5/0064; H04L 1/1887; H04L 5/0007; H04L 5/003
See application file for complete search history.

(56) References Cited

U.S. PATENT DOCUMENTS

2019/0335428 A1* 10/2019 Bendlin .............. H04W 72/042
2020/0187173 A1*  6/2020 Ye .................... H04W 72/1289

FOREIGN PATENT DOCUMENTS

| WO | WO2017052319 | 3/2017 |
|---|---|---|
| WO | WO2017/069470 | 4/2017 |
| WO | WO2017069474 | 4/2017 |
| WO | WO2017079539 | 5/2017 |
| WO | WO2017123286 | 7/2017 |

OTHER PUBLICATIONS

LG Electronics, "Summary of TDD Common aspects," R1-1807527, 3GPP TSG RAN WG1 Meeting #93, Busan, Korea, dated May 21-25, 2018, 19 pages.

CATT, "NB-PUSCH/NB-PDSCH coding and repetition for NB-IoT," R1-161955, 3GPP TSG RAN WG1 NB-IoT Ad-Hoc Meeting, Sophia Antipolis, France, dated Mar. 22-24, 2016, 4 pages.

Ericsson, "On the UL of NB-IoT TDD," R1-1712631, 3GPP TSG-RAN WG1 Meeting #90, Prague, Czech Republic, dated Aug. 21-25, 2017, 9 pages.

Korean Notice of Allowance in Korean Application No. 10-2020-7006926, dated Dec. 9, 2020, 5 pages (with English translation).

LG Electronics, "SPS support in NB-IoT," R1-1707573, 3GPP TSG RAN WG1 Meeting #89, Hangzhou, P.R. China, dated May 15-19, 2017, 3 pages.

Nokia, Alcatel-Lucent Shanghai Bell, "On resource allocation and TBS determination for PDSCH and CP-OFDM based PUSCH in NR," R1-1708521, 3GPP TSG RAN WG1#89, Hangzhou, China, dated May 15-19, 2017, 4 pages.

Park et al., "Standardization trends related to NB-IoT in 3GPP," Telecommunications and Technology Association, TTA Journal, vol. 166, Jul. 2016, 11 pages (with English translation).

PCT International Search Report and Written Opinion in International Application No. PCT/KR2018/009187, dated Nov. 15, 2018, 16 pages (with English translation).

Extended European Search Report in European Appln. No. 18843838.6, dated Aug. 4, 2020, 7 pages.

\* cited by examiner

METHOD AND DEVICE FOR WIRELESS SIGNAL TRANSMISSION OR RECEPTION IN WIRELESS COMMUNICATION SYSTEM

CROSS-REFERENCE TO RELATED APPLICATIONS

This application is a continuation of U.S. application Ser. No. 16/786,624, filed on Feb. 10, 2020, now allowed, which is a continuation of International Application No. PCT/KR2018/009187, filed on Aug. 10, 2018, which claims the benefit of Korean Application No. 10-2018-0056995, filed on May 18, 2018, Korean Application No. 10-2018-0053607, filed on May 10, 2018, Korean Application No. 10-2018-0050204, filed on Apr. 30, 2018, U.S. Provisional Application No. 62/662,204, filed on Apr. 24, 2018, U.S. Provisional Application No. 62/591,137, filed on Nov. 27, 2017, U.S. Provisional Application No. 62/586,208, filed on Nov. 15, 2017, and U.S. Provisional Application No. 62/543,928, filed on Aug. 10, 2017. The disclosures of the prior applications are incorporated by reference in their entirety.

TECHNICAL FIELD

The present disclosure relates to a wireless communication system, and more particularly, to a method and apparatus for transmitting/receiving a wireless signal. The wireless communication system includes a narrowband Internet of things (NB-IoT)-based wireless communication system.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An aspect of the present disclosure is to provide a method and apparatus for efficiently transmitting and receiving a wireless signal in a wireless communication.

It will be appreciated by persons skilled in the art that the objects that could be achieved with the present disclosure are not limited to what has been particularly described hereinabove and the above and other objects that the present disclosure could achieve will be more clearly understood from the following detailed description.

In an aspect of the present disclosure, a method of receiving a signal by a user equipment (UE) in a wireless communication system includes repeatedly transmitting a physical uplink shared channel (PUSCH) and repeatedly receiving a physical downlink shared channel (PDSCH) in a downlink period successive to the repeated transmissions of the PUSCH. When the UE operates in an in-band mode, reception of each PDSCH starts in an orthogonal frequency division multiplexing (OFDM) symbol after a $k^{th}$ (k>1) OFDM symbol in a time unit related to the PDSCH in the DL period, and when the UE operates in a guard-band or stand-alone mode, a signal reception is skipped at the start of the DL period during the repeated receptions of the PDSCH.

In another aspect of the present disclosure, a UE in a wireless communication system includes a radio frequency (RF) module and a processor. The processor is configured to repeatedly transmit a PUSCH, and repeatedly receive a PDSCH in a downlink period successive to the repeated transmissions of the PUSCH. When the UE operates in an in-band mode, reception of each PDSCH starts in an OFDM symbol after a $k^{th}$ (k>1) OFDM symbol in a time unit related to the PDSCH in the DL period, and when the UE operates in a guard-band or stand-alone mode, a signal reception is skipped at the start of the DL period during the repeated receptions of the PDSCH.

The UE may include a narrowband Internet of things (NB-IoT) UE.

When the UE operates in the guard-band or stand-alone mode, the signal reception may be skipped in at least part of a first OFDM symbol of a first time unit in the DL period during the repeated receptions of the PDSCH. Herein, a signal reception may start in a first OFDM symbol of each of second and subsequent successive time units in the DL period during the repeated receptions of the PDSCH.

The repeated transmissions of the PUSCH and the repeated receptions of the PDSCH may be performed in time division multiplexing (TDM) in the same carrier.

The PUSCH may include a narrowband PUSCH (NPUSCH), the PDSCH may include a narrowband PDSCH (NPDSCH), and a subcarrier spacing used for transmission of the NPDSCH may be 15 kHz.

The wireless communication system may include a $3^{rd}$ party partnership project (3GPP)-based wireless communication system.

According to the present disclosure, wireless signal transmission and reception can be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE. While the following description is given, centering on 3GPP LTE/LTE-A for clarity, this is purely exemplary and thus should not be construed as limiting the present disclosure.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

Figure 1:
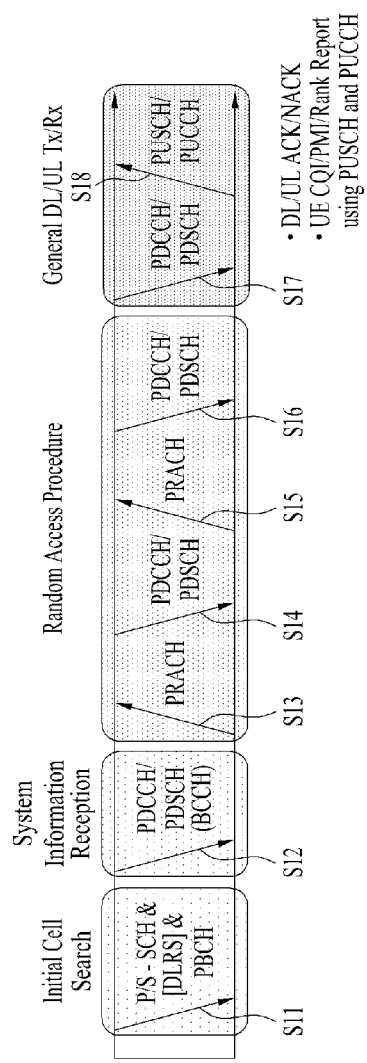
FIG. 1 is a diagram illustrating physical channels used in a $3^{rd}$ generation partnership project (3GPP) long term evolution (-advanced) (LTE(-A)) as an exemplary wireless communication system and a signal transmission method using the same.

FIG. 1 illustrates physical channels used in 3GPP LTE(-A) and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the meantime, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
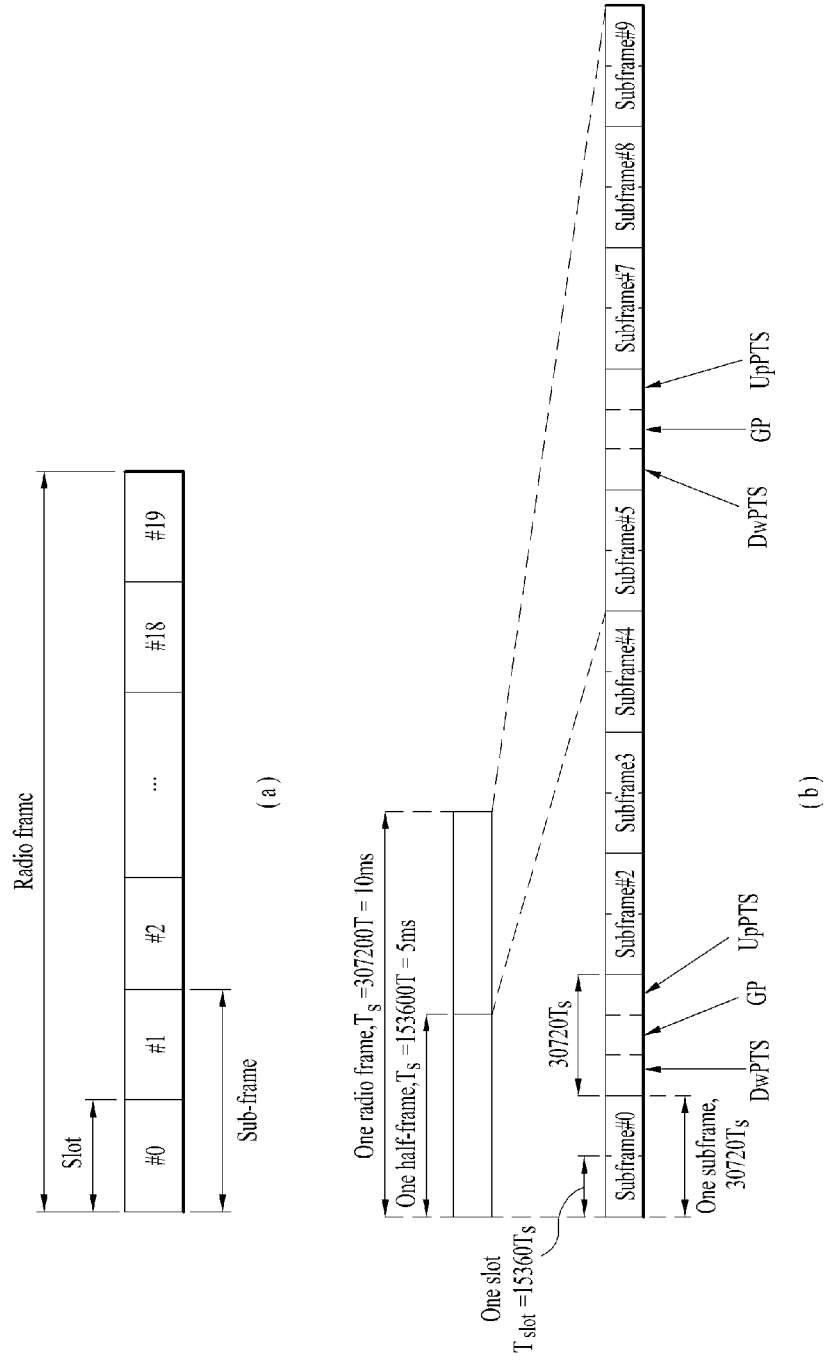
FIG. 2 is a diagram illustrating a radio frame structure.

FIG. 2 illustrates a radio frame structure. Uplink/downlink data packet transmission is performed on a subframe-by-subframe basis. A subframe is defined as a predetermined time interval including a plurality of symbols. 3GPP LTE supports a type-1 radio frame structure applicable to frequency division duplex (FDD) and a type-2 radio frame structure applicable to time division duplex (TDD).

FIG. 2(*a*) illustrates a type-1 radio frame structure. A downlink subframe includes 10 subframes each of which includes 2 slots in the time domain. A time for transmitting a subframe is defined as a transmission time interval (TTI). For example, each subframe has a duration of 1 ms and each slot has a duration of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 4(5) normal subframes and 10 special subframes. The normal subframes are used for uplink or downlink according to UL-DL configuration. A subframe is composed of 2 slots.

Table 1 shows subframe configurations in a radio frame according to UL-DL configurations.

TABLE 1

| Uplink-downlink configuration | Downlink-to-Uplink Switch point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is used for initial cell search, synchronization or channel estimation in a UE and UpPTS is used for channel estimation in a BS and uplink transmission synchronization in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
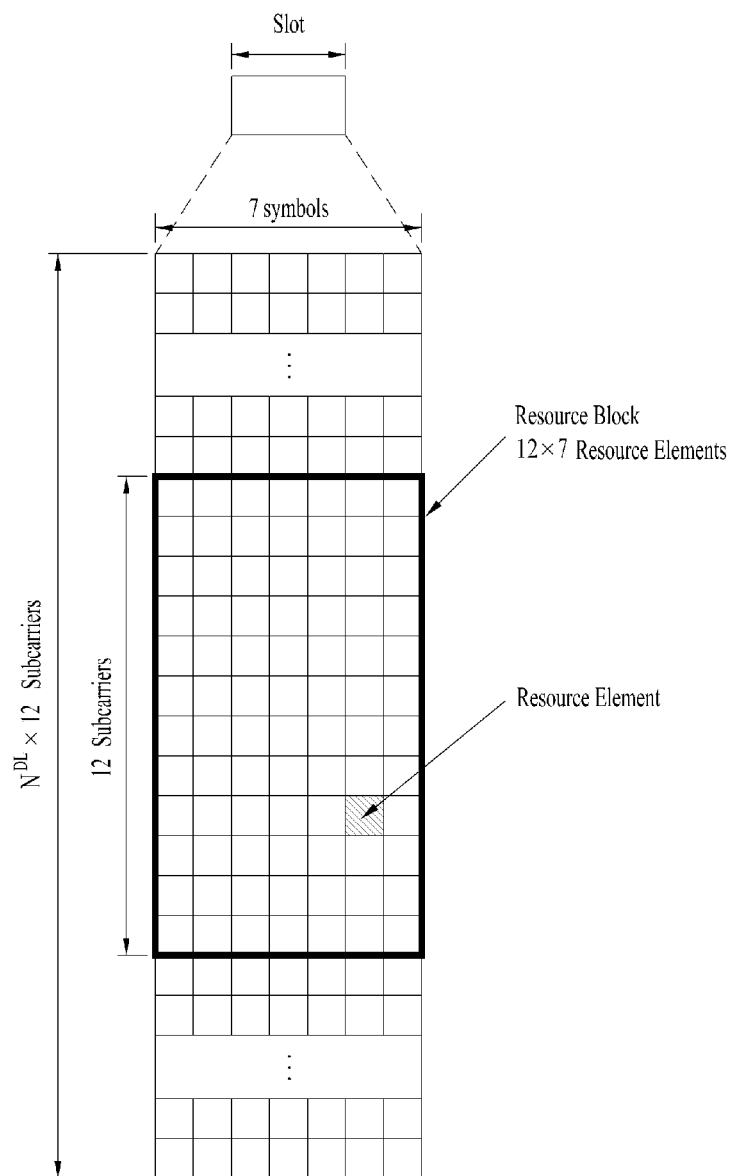
FIG. 3 is a diagram illustrating a resource grid of a downlink slot.

FIG. 3 illustrates a resource grid of a downlink slot.

Referring to FIG. 3, a downlink slot includes a plurality of OFDM symbols in the time domain. While one downlink slot may include 7 OFDM symbols and one resource block (RB) may include 12 subcarriers in the frequency domain in the figure, the present disclosure is not limited thereto. Each element on the resource grid is referred to as a resource element (RE). One RB includes 12×7 REs. The number NRB of RBs included in the downlink slot depends on a downlink transmit bandwidth. The structure of an uplink slot may be same as that of the downlink slot.

Figure 4:
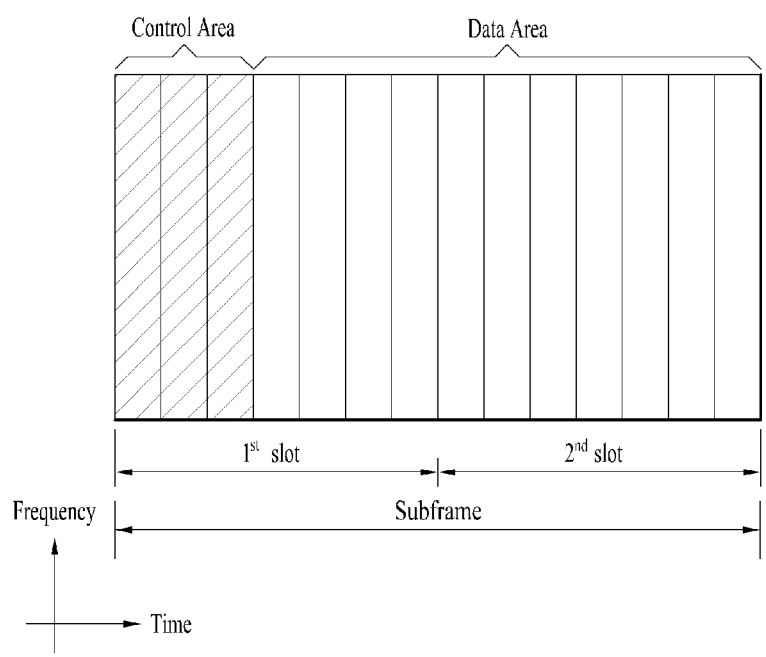
FIG. 4 is a diagram illustrating a downlink (DL) subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A basic resource unit of the data region is an RB. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries a HARQ acknowledgment (ACK)/negative-acknowledgment (NACK) signal. Control information transmitted through the PDCCH is referred to as downlink control information (DCI). The DCI includes uplink or downlink scheduling information or an uplink transmit power control command for an arbitrary UE group.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. Information field type, the number of information fields, the number of bits of each information field, etc. depend on DIC format. For example, the DCI formats selectively include information such as hopping flag, RB assignment, MCS (Modulation Coding Scheme), RV (Redundancy Version), NDI (New Data Indicator), TPC (Transmit Power Control), HARQ process number, PMI (Precoding Matrix Indicator) confirmation as necessary. Accordingly, the size of control information matched to a DCI format depends on the DCI format. An arbitrary DCI format may be used to transmit two or more types of control information. For example, DIC formats 0/1A is used to carry DCI format 0 or DIC format 1, which are discriminated from each other using a flag field.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

The PDCCH carries a message known as DCI which includes resource assignment information and other control information for a UE or UE group. In general, a plurality of PDCCHs can be transmitted in a subframe. Each PDCCH is transmitted using one or more CCEs. Each CCE corresponds to 9 sets of 4 REs. The 4 REs are referred to as an REG. 4 QPSK symbols are mapped to one REG. REs allocated to a reference signal are not included in an REG, and thus the total number of REGs in OFDM symbols depends on presence or absence of a cell-specific reference signal. The concept of REG (i.e. group based mapping, each group including 4 REs) is used for other downlink control channels (PCFICH and PHICH). That is, REG is used as a basic resource unit of a control region. 4 PDCCH formats are supported as shown in Table 2.

TABLE 2

| PDCCH format | Number of CCEs (n) | Number of REGs | Number of PDCCH bits |
|---|---|---|---|
| 0 | 1 | 9 | 72 |
| 1 | 2 | 8 | 144 |
| 2 | 4 | 36 | 288 |
| 3 | 5 | 72 | 576 |

CCEs are sequentially numbered. To simplify a decoding process, transmission of a PDCCH having a format including n CCEs can be started using as many CCEs as a multiple of n. The number of CCEs used to transmit a specific PDCCH is determined by a BS according to channel condition. For example, if a PDCCH is for a UE having a high-quality downlink channel (e.g. a channel close to the BS), only one CCE can be used for PDCCH transmission. However, for a UE having a poor channel (e.g. a channel close to a cell edge), 8 CCEs can be used for PDCCH transmission in order to obtain sufficient robustness. In addition, a power level of the PDCCH can be controlled according to channel condition.

LTE defines CCE positions in a limited set in which PDCCHs can be positioned for each UE. CCE positions in a limited set that the UE needs to monitor in order to detect the PDCCH allocated thereto may be referred to as a search space (SS). In LTE, the SS has a size depending on PDCCH format. A UE-specific search space (USS) and a common search space (CSS) are separately defined. The USS is set per UE and the range of the CSS is signaled to all UEs. The USS and the CSS may overlap for a given UE. In the case of a considerably small SS with respect to a specific UE, when some CCEs positions are allocated in the SS, remaining CCEs are not present. Accordingly, the BS may not find CCE resources on which PDCCHs will be transmitted to available UEs within given subframes. To minimize the possibility that this blocking continues to the next subframe, a UE-specific hopping sequence is applied to the starting point of the USS.

Table 3 shows sizes of the CSS and USS.

TABLE 3

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

To control computational load of blind decoding based on the number of blind decoding processes to an appropriate level, the UE is not required to simultaneously search for all defined DCI formats. In general, the UE searches for formats 0 and 1A at all times in the USS. Formats 0 and 1A have the same size and are discriminated from each other by a flag in a message. The UE may need to receive an additional format (e.g. format 1, 1B or 2 according to PDSCH transmission mode set by a BS). The UE searches for formats 1A and 1C in the CSS. Furthermore, the UE may be set to search for format 3 or 3A. Formats 3 and 3A have the same size as that of formats 0 and 1A and may be discriminated from each other by scrambling CRC with different (common) identifiers rather than a UE-specific identifier. PDSCH transmission schemes and information content of DCI formats according to transmission mode (TM) are arranged below.

Transmission Mode (TM)
 Transmission mode 1: Transmission from a single base station antenna port
 Transmission mode 2: Transmit diversity
 Transmission mode 3: Open-loop spatial multiplexing
 Transmission mode 4: Closed-loop spatial multiplexing
 Transmission mode 5: Multi-user MIMO (Multiple Input Multiple Output)
 Transmission mode 6: Closed-loop rank-1 precoding
 Transmission mode 7: Single-antenna port (ports) transmission
 Transmission mode 8: Double layer transmission (ports 7 and 8) or single-antenna port (port 7 or 8) transmission
 Transmission mode 9: Transmission through up to 8 layers (ports 7 to 14) or single-antenna port (port 7 or 8) transmission DCI Format
 Format 0: Resource grants for PUSCH transmission
 Format 1: Resource assignments for single codeword PDSCH transmission (transmission modes 1, 2 and 7)
 Format 1A: Compact signaling of resource assignments for single codeword PDSCH (all modes)
 Format 1B: Compact resource assignments for PDSCH using rank-1 closed loop precoding (mode 6)
 Format 1C: Very compact resource assignments for PDSCH (e.g. paging/broadcast system information)
 Format 1D: Compact resource assignments for PDSCH using multi-user MIMO (mode 5)
 Format 2: Resource assignments for PDSCH for closed-loop MIMO operation (mode 4)
 Format 2A: Resource assignments for PDSCH for open-loop MIMO operation (mode 3)
 Format 3/3A: Power control commands for PUCCH and PUSCH with 2-bit/1-bit power adjustments FIG. 5 illustrates a structure of an uplink subframe used in LTE(-A).

Figure 5:
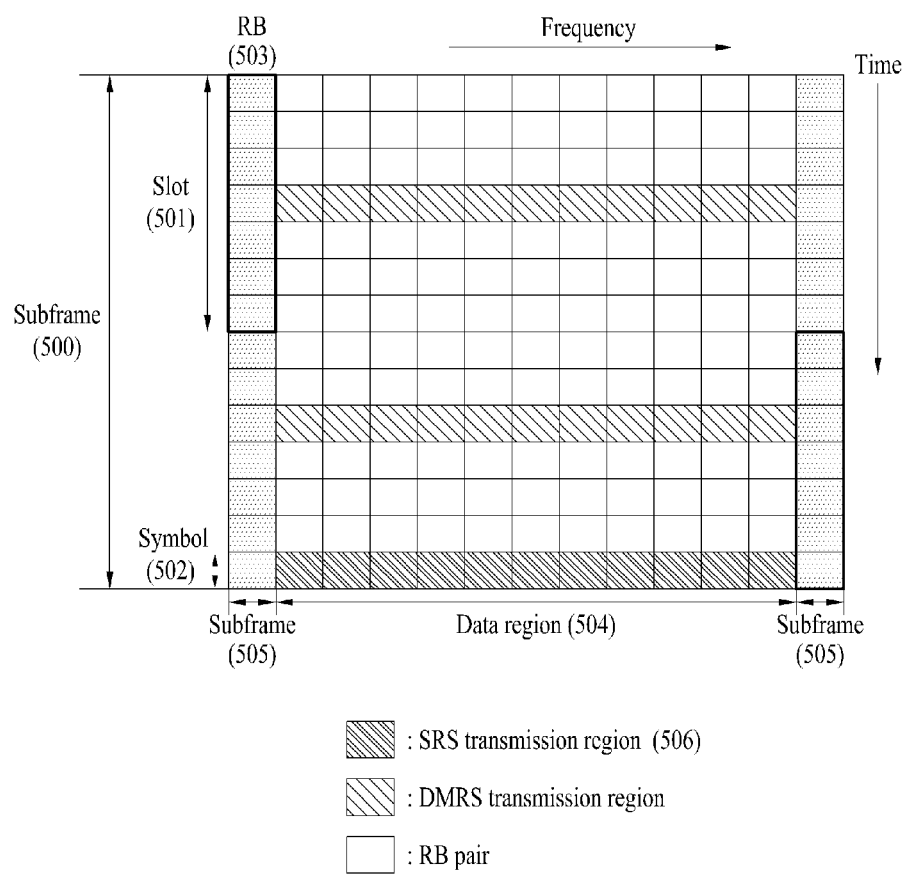
FIG. 5 is a diagram illustrating the structure of an uplink (UL) subframe used in LTE(-A).

Referring to FIG. 5, a subframe 500 is composed of two 0.5 ms slots 501. Assuming a length of a normal cyclic prefix (CP), each slot is composed of 7 symbols 502 and one symbol corresponds to one SC-FDMA symbol. A resource block (RB) 503 is a resource allocation unit corresponding to 12 subcarriers in the frequency domain and one slot in the time domain. The structure of the uplink subframe of LTE(-A) is largely divided into a data region 504 and a control region 505. A data region refers to a communication resource used for transmission of data such as voice, a packet, etc. transmitted to each UE and includes a physical uplink shared channel (PUSCH). A control region refers to a communication resource for transmission of an uplink control signal, for example, downlink channel quality report from each UE, reception ACK/NACK for a downlink signal, uplink scheduling request, etc. and includes a physical uplink control channel (PUCCH). A sounding reference signal (SRS) is transmitted through an SC-FDMA symbol that is lastly positioned in the time axis in one subframe. SRSs of a plurality of UEs, which are transmitted to the last SC-FDMAs of the same subframe, can be differentiated according to frequency positions/sequences. The SRS is used to transmit an uplink channel state to an eNB and is periodically transmitted according to a subframe period/offset set by a higher layer (e.g., RRC layer) or aperiodically transmitted at the request of the eNB.

Figure 6:
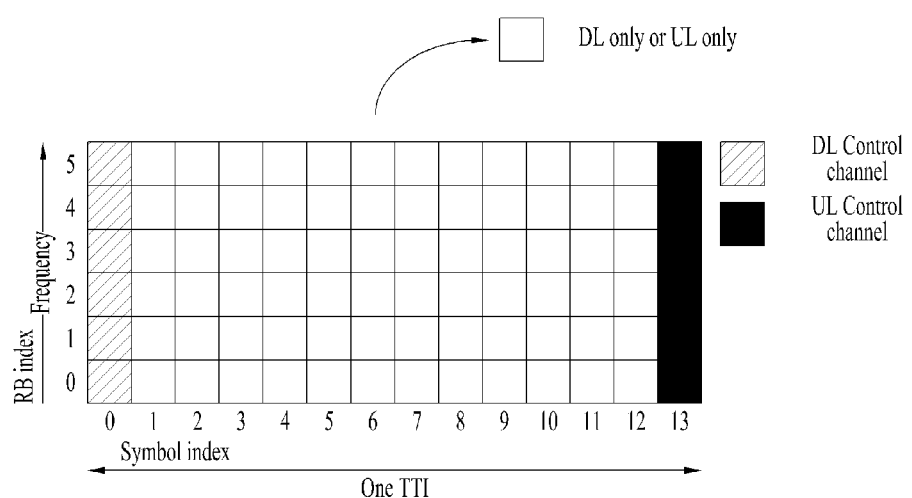
FIG. 6 is a diagram illustrating a self-contained subframe structure.

To minimize data transmission latency, a self-contained subframe is considered in the next-generation radio access technology (RAT). FIG. 6 illustrates an exemplary self-contained subframe structure. In FIG. 6, the hatched area represents a DL control region, and the black area represents a UL control region. The area having no marks may be used for either DL data transmission or UL data transmission. In this structure, DL transmission and UL transmission are sequentially performed in one subframe to transmit DL data and receive a UL ACK/NACK for the DL data in the subframe. As a result, the resulting reduction of a time taken to retransmit data when a data transmission error occurs may lead to minimization of the latency of a final data transmission.

At least the following four subframe types may be considered as exemplary self-contained subframe types. Periods are enumerated in time order.

DL control period+DL data period+guard period (GP)+ UL control period

DL control period+DL data period

DL control period+GP+UL data period+UL control period

DL control period+GP+UL data period

A PDFICH, a PHICH, and a PDCCH may be transmitted in the DL control period, and a PDSCH may be transmitted in the DL data period. A PUCCH may be transmitted in the UL control period, and a PUSCH may be transmitted in the UL data period. The GP provides a time gap for switching from a transmission mode to a reception mode or from the reception mode to the transmission mode at an eNB and a UE. Some OFDM symbol(s) at a DL-to-UL switching time may be configured as the GP.

In the environment of the 3GPP NR system, different OFDM numerologies, for example, different subcarrier spacings (SCSs) and hence different OFDM symbol (OS) durations may be configured between a plurality of cells aggregated for one UE. Accordingly, the (absolute time) duration of a time resource (e.g., SF, slot or TTI) (referred to as a time unit (TU) for convenience) including the same number of symbols may be set differently for the aggregated cells. Herein, the term symbol may cover OFDM symbol and SC-FDMA symbol.

Figure 7:
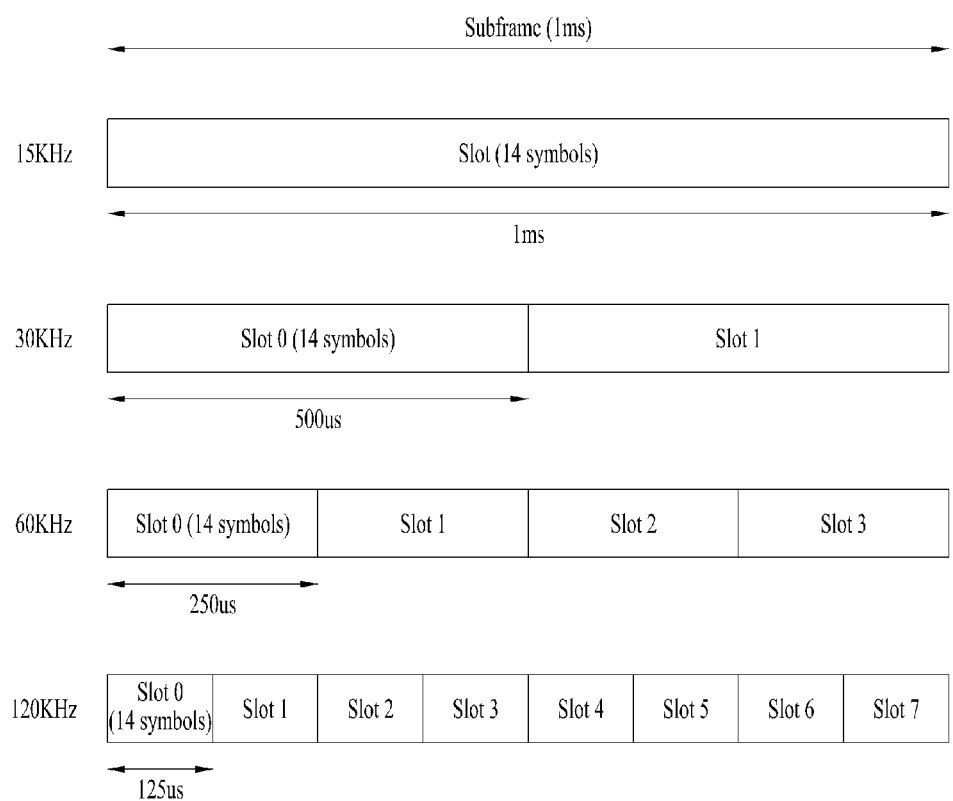
FIG. 7 is a diagram illustrating a frame structure defined for 3GPP new radio access technology (NR).

FIG. 7 illustrates a frame structure for 3GPP NR. In 3GPP NR, one radio frame includes 10 subframes each being 1 ms in duration, like a radio frame in LTE/LTE-A (see FIG. 2). One subframe includes one or more slots and the length of a slot varies with an SCS. 3GPP NR supports SCSs of 15 KHz, 30 KHz, 60 KHz, 120 KHz, and 240 KHz. A slot corresponds to a TTI of FIG. 6.

As noted from Table 4, the number of symbols per slot, the number of slots per frame, and the number of slots per subframe vary according to an SCS.

TABLE 4

| SCS (15*2^u) | Number of symbols per slot | Number of slots per frame | Number of slots per subframe |
| --- | --- | --- | --- |
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

A description will be given of narrowband Internet of things (NB-IoT). While NB-IoT is described based on the 3GPP LTE standards for convenience, the following description is also applicable to the 3GPP NR standards. For this purpose, some technical configurations may be replaced with other ones in interpretation (e.g., LTE band→NR band and subframe→slot).

NB-IoT supports three operation modes: in-band mode, guard-band mode, and stand-alone mode. The same requirements apply to each mode.

(1) In-band mode: a part of the resources of the LTE band are allocated to NB-IoT.

(2) Guard-band mode: a guard frequency band of the LTE band is used, and an NB-IoT carrier is arranged as close as possible to an edge subcarrier of the LTE band.

(3) Stand-alone mode: some carriers in the GSM band are allocated to NB-IoT.

An NB-IoT UE searches for an anchor carrier in units of 100 kHz, for initial synchronization, and the center frequency of the anchor carrier should be located within ±7.5 kHz from a 100-kHz channel raster in the in-band and guard-band. Further, the center 6 physical resource blocks (PRBs) of the LTE PRBs are not allocated to NB-IoT. Therefore, the anchor carrier may be located only in a specific PRB.

Figure 8:
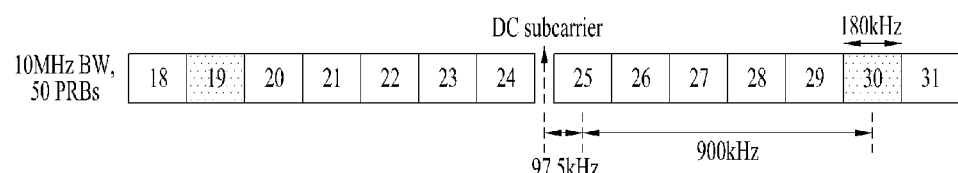
FIG. 8 is a diagram illustrating arrangement of an in-band anchor carrier for an LTE bandwidth of 10 MHz.

FIG. 8 is a diagram illustrating arrangement of an in-band anchor carrier in an LTE bandwidth of 10 MHz.

Referring to FIG. 8, a direct current (DC) subcarrier is located on a channel raster. Since the center frequency spacing between adjacent PRBs is 180 kHz, the center frequencies of PRBs 4, 9, 14, 19, 30, 35, 40 and 45 are located at ±2.5 kHz from the channel raster. When the bandwidth is 20 MHz, the center frequency of a PRB suitable for transmission on the anchor carrier is located at ±2.5 kHz from the channel raster, and when the bandwidth is 3 MHz, 5 MHz, or 15 MHz, the center frequency of a PRB suitable for transmission on the anchor carrier is located at ±7.5 kHz from the channel raster.

In the guard-band mode, given bandwidths of 10 MHz and 20 MHz, the center frequency of a PRB immediately adjacent to an edge PRB of the LTE system is located at ±2.5 kHz from the channel raster. Further, given bandwidths of 3 MHz, 5 MHz, and 15 MHz, a guard frequency band corresponding to three subcarriers from an edge PRB is used, and thus the center frequency of the anchor carrier may be located at ±7.5 kHz from the channel raster.

In the stand-alone mode, an anchor carrier is aligned with the 100-kHz channel raster, and all GSM carriers including the DC carrier may be available as NB-IoT anchor carriers.

Further, NB-IoT may support multiple carriers, and a combination of in-band and in-band, a combination of in-band and guard-band, a combination of guard-band and guard-band, and a combination of stand-alone and stand-alone are available.

NB-IoT DL uses OFDMA with a 15-kHz SCS. OFDMA provides orthogonality between subcarriers, so that the NB-IoT system and the LTE system may coexist smoothly.

For NB-IoT DL, physical channels such as a narrowband physical broadcast channel (NPBCH), a narrowband physical downlink shared channel (NPDSCH), and a narrowband physical downlink control channel (NPDCCH) may be provided, and physical signals such as a narrowband primary synchronization signal (NPSS), a narrowband primary synchronization signal (NSSS), and a narrowband reference signal (NRS) are provided.

The NPBCH delivers minimum system information required for an NB-IoT UE to access the system, a master information block-narrowband (MIB-NB) to the NB-IoT UE. The NPBCH may be transmitted repeatedly eight times in total for coverage enhancement. The transport block size (TBS) of the MIB-NB is 34 bits and updated every TTI of 640 ms. The MIB-NB includes information about an operation mode, a system frame number (SFN), a hyper-SFN, the number of cell-specific reference signal (CRS) ports, and a channel raster offset.

The NPSS is composed of a Zadoff-Chu (ZC) sequence of length 11 and a root index of 5. The NPSS may be generated by the following equation.

$$d_l(n) = S(l) \cdot e^{-j\frac{\pi u n(n+1)}{11}}, n = 0, 1, \ldots, 10 \quad \text{[Equation 1]}$$

S(1) for symbol index 1 may be defined as illustrated in Table 5.

TABLE 5

| Cyclic prefix length | S(3), . . . , S(13) | | | | | | | | | | |
|---|---|---|---|---|---|---|---|---|---|---|---|
| Normal | 1 | 1 | 1 | 1 | −1 | −1 | 1 | 1 | 1 | −1 | 1 |

The NSSS is composed of a combination of a ZC sequence of length 131 and a binary scrambling sequence such as a Hadamard sequence. The NSSS indicates a PCID to NB-IoT UEs within the cell by the combination of sequences.

The NSSS may be generated by following equation.

$$d(n) = b_q(m)e^{-j2\pi\theta_f n}e^{-j\frac{\pi u n'(n'+1)}{131}} \quad \text{[Equation 2]}$$

Variables applied to Equation 2 may be defined as follows.

$$n = 0, 1, \ldots, 131 \quad \text{[Equation 3]}$$
$$n' = n \bmod 131$$
$$m = n \bmod 128$$
$$u = N_{ID}^{Ncell} \bmod 126 + 3$$
$$q = \left\lfloor \frac{N_{ID}^{Ncell}}{126} \right\rfloor$$

A binary sequence $b_q(m)$ may be defined as illustrated in Table 6, and $b_0(m)$ to $b_3(m)$ represent columns 1, 32, 64, and 128 of a Hadamard matrix of order 128. A cyclic shift $\theta_f$ for a frame number $n_f$ may be defined by Equation 4 below.

TABLE 6

| q | $b_q(0), \ldots, b_q(127)$ |
|---|---|
| 0 | [1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1 1] |
| 1 | [1 −1 −1 1 −1 1 1 −1 −1 1 1 −1 1 −1 −1 1 1 −1 1 −1 −1 1 1 −1 −1 1 1 −1 1 −1 −1 1 −1 1 1 1 −1 1 1 −1 1 −1 −1 1 1 1 1 −1 −1 1 1 −1 1 −1 −1 1 1 −1 1 −1 −1 1 1 −1 1 −1 −1 1 1 −1 1 −1 −1 1 −1 1 1 −1 −1 1 −1 −1 1 −1 −1 1 −1 1 −1 −1 −1 1 −1 −1 1 −1 −1 −1 1 −1 1 1 −1 −1 1 −1 −1 1 −1 −1 1 1 1 −1 1 1 −1 1 −1 −1 1 1 −1 −1 1 1 −1 1 1 −1] |
| 2 | [1 −1 −1 1 −1 1 1 −1 1 1 −1 1 1 −1 −1 1 1 −1 1 1 1 −1 1 1 −1 1 1 −1 −1 1 1 1 −1 1 −1 1 1 −1 1 1 −1 1 −1 −1 1 1 −1 −1 1 1 −1 −1 1 1 1 −1 1 −1 −1 1 1 −1 1 −1 1 1 −1 1 −1 −1 1 1 −1 1 −1 −1 1 1 1 −1 1 −1 −1 1 −1 1 1 −1 1 −1 −1 1 1 −1 −1 1 1 −1 −1 1 1 −1 1 1 −1 −1 1 −1 1 1 1 −1 1 −1 1 1 1 −1 −1 1 1 −1 −1 1 1 −1 1 −1 −1 1 1] |
| 3 | [1 −1 1 −1 1 1 −1 −1 1 1 −1 1 −1 −1 1 1 −1 1 −1 1 1 1 −1 1 1 −1 1 1 −1 1 1 1 −1 1 −1 1 1 −1 −1 1 −1 1 1 −1 1 1 −1 1 1 −1 1 −1 −1 1 1 −1 1 −1 −1 1 1 −1 1 −1 1 1 −1 1 1 −1 1 −1 1 1 1 −1 −1 1 1 −1 1 1 −1 1 −1 −1 1 −1 1 −1 1 1 1 −1 1 1 −1 −1 1 1 −1 1 −1 −1 1 1 −1 1 −1 1 1 −1 −1 1 −1 1 1 −1 1 −1 −1 1 1 −1 1 −1 −1 1 1 1 −1] |

$$\theta_f = \frac{33}{132}(n_f/2) \bmod 4 \quad \text{[Equation 4]}$$

In Equation 4, of represents a radio frame number and mod represents a modulo function.

The NRS, which is a reference signal for channel estimation required for demodulation of a DL physical channel, is generated in the same manner as in LTE. However, the NRS uses a narrowband-physical cell ID (NB-PCID) (or NCell ID or NB-IoT BS ID) as an initial value for initialization. The NRS is transmitted through one or two antenna ports (p=2000 and 2001).

The NPDCCH has the same transmission antenna configuration as the NPBCH, and delivers DCI. The NPDCCH supports three types of DCI formats. DCI format N0 includes scheduling information about a narrowband physical uplink shared channel (NPUSCH), and DCI formats N1 and N2 includes NPDSCH scheduling information. The NPDCCH may be transmitted repeatedly up to 2048 times, for coverage enhancement.

The NPDSCH is used to transmit data of a transport channel such as a DL-SCH or a paging channel (PCH). The NPDSCH has a maximum TBS of 680 bits and may be transmitted repeatedly up to 2048 times, for coverage enhancement.

Figure 9:
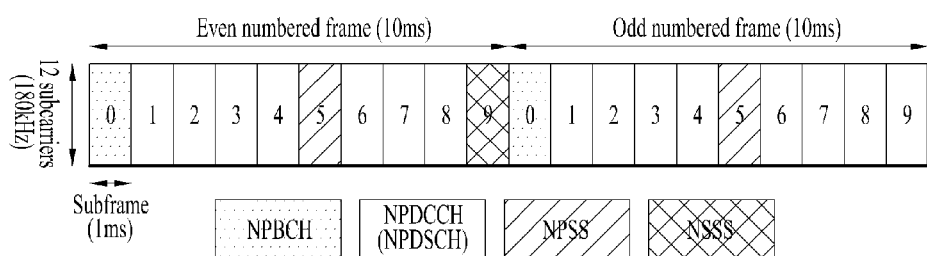
FIG. 9 is a diagram illustrating positions where narrowband Internet of things (NB-IoT) physical DL channels/signals are transmitted in a frequency division duplex (FDD) LTE system.

FIG. 9 is a diagram illustrating positions where narrowband NB-IoT physical DL channels/signals are transmitted in an FDD LTE system.

Referring to FIG. 9, the NPBCH is transmitted in the first subframe of each radio frame, the NPSS is transmitted in the sixth subframe of each radio frame, and the NSSS is transmitted in the last subframe of each even-numbered frame. An NB-IoT UE acquires frequency synchronization, symbol synchronization, and frame synchronization and searches 504 PCIDs (i.e., BS IDs) by synchronization signals (NPSS and NSSS). The LTS synchronization signals are transmitted in 6 PRBs, whereas the NB-IoT synchronization signals are transmitted in one PRB.

In NB-IoT, UL physical channels include a narrowband physical random access channel (NPRACH) and an NPUSCH, and support single-tone transmission and multi-tone transmission. Multi-tone transmission is supported only for an SCS of 15 kHz, and single-tone transmission is supported for SCSs of 3.5 kHz and 15 kHz. On UL, when the SCS is 15 kHz, orthogonality with the LTE system is maintained, thereby providing optimum performance. However, the 3.75-kHz SCS may destroy the orthogonality, resulting in performance degradation due to interference.

An NPRACH preamble includes four symbol groups, each including a CP and five (SC-FDMA) symbols. The NPRACH supports only single-tone transmission with the 3.75-kHz SCS and provides CPs of 66.7 µs and 266.67 µs in length to support different cell radiuses. Each symbol group is subjected to frequency hopping in the following hopping pattern. Subcarriers carrying the first symbol group are determined pseudo-randomly. The second symbol group hops by one subcarrier, the third symbol group hops by six subcarriers, and the fourth symbol group hops by one subcarrier. In the case of repeated transmissions, the frequency hopping procedure is repeatedly applied. To enhance coverage, the NPRACH preamble may be repeatedly transmitted up to 128 times.

The NPUSCH supports two formats. NPUSCH format 1 is used for UL-SCH transmission and has a maximum TBS of 1000 bits. NPUSCH format 2 is used for UCI transmission such as HARQ-ACK signaling. NPUSCH format 1 supports single-tone transmission and multi-tone transmission, whereas NPUSCH format 2 supports only single-tone transmission. In single-tone transmission, p/2-binary phase shift keying (BPSK) and p/4-quadrature phase shift keying (QPSK) may be used to reduce a peak-to-average power ratio (PAPR).

In the stand-alone and guard-band modes, all resources of one PRB may be allocated to NB-IoT. However, there is a constraint on resource mapping in the in-band mode, for co-existence with a legacy LTE signal. For example, resources (OFDM symbols 0 to 2 in each subframe) classified as a region allocated for LTE control channels may not be allocated to the NPSS and NSSS, and NPSS and NSSS symbols mapped to LTE CRS REs are punctured.

Figure 10:
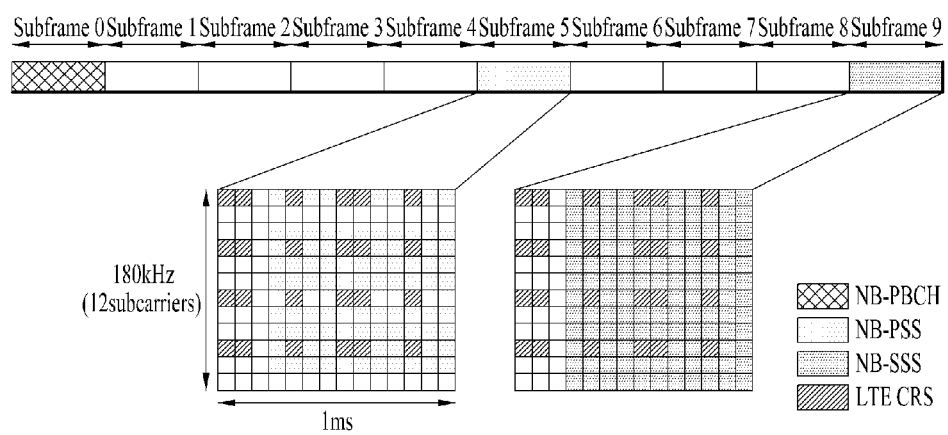
FIG. 10 is a diagram illustrating resource allocation for an NB-IoT signal and an LTE signal in an in-band mode.

FIG. 10 is a diagram illustrating resource allocation to an NB-IoT signal and an LTE signal in the in-band mode. Referring to FIG. 10, for ease of implementation, the NPSS and NSSS are not transmitted in OFDM symbols corresponding to the control region of the legacy LTE system (the first three OFDM symbols of a subframe) regardless of an operation mode. NPSS/NSS REs colliding with LTE CRS REs in physical resources are punctured, for mapping without affecting the legacy LTE system.

After the cell search, the NB-IoT UE demodulates the NPBCH without system information except for a PCID. Therefore, NPBCH symbols may not be mapped to the LTE control channel allocation region. Moreover, since the NB-IoT UE assumes four LTE antenna ports (e.g., p=0, 1, 2, and 3) and two NB-IoT antenna ports (e.g., p=2000 and 2001) in the situation without system information, the NB-IoT UE may not allocate the NPBCH to CRS REs and NRS REs. Therefore, the NPBCH is rate-matched according to available resources.

After demodulating the NPBCH, the NB-IoT UE may acquire information about the number of CRS antenna ports. However, the NB-IoT UE still may not acquire information about the LTE control channel allocation region. Therefore, the NPDSCH carrying system information block type 1 (SIB1) data is not mapped to resources classified as the LTE control channel allocation region.

However, unlike the NPBCH, REs which are not allocated to the LTE CRS may be allocated to the NPDSCH. Since the NB-IoT UE has acquired all information related to resource mapping after receiving SIB1, an eNB may map the NPDSCH (except for the case where SIB1 is transmitted) and the NPDCCH to available resources based on LTE control channel information and the number of CRS antenna ports.

Figure 11:
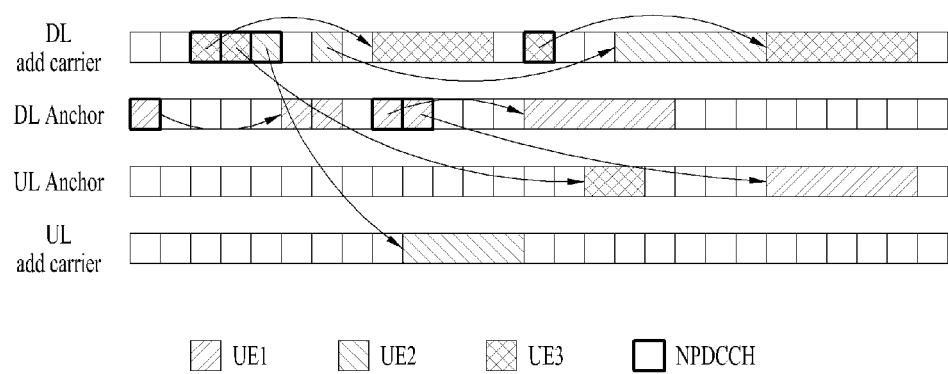
FIG. 11 is a diagram illustrating multi-carrier scheduling.

FIG. 11 is a diagram illustrating an exemplary operation when multiple carriers are configured in FDD NB-IoT. In FDD NB-IoT, a DL/UL anchor carrier is basically configured, and a DL (and UL) non-anchor carrier may be additionally configured. RRCConnectionReconfiguration may include information about the non-anchor carrier. When the DL non-anchor carrier is configured, a UE receives data only in the DL non-anchor carrier. In contrast, synchronization signals (NPSS and NSSS), a broadcast signal (MIB and SIB), and a paging signal are provided only in the anchor carrier. When the DL non-anchor carrier is configured, the UE listens to only the DL non-anchor carrier while the UE is in an RRC_CONNECTED state. Similarly, when the UL non-anchor carrier is configured, the UE transmits data only in the UL non-anchor carrier, not being allowed to transmit data simultaneously in the UL non-anchor carrier and the UL anchor carrier. When the UE transitions to an RRC_IDLE state, the UE returns to the anchor carrier.

In the illustrated case of FIG. 11, UE1 is configured only with anchor carriers, UE2 is configured additionally with a DL/UL non-anchor carrier, and UE3 is configured additionally with a DL non-anchor carrier. Accordingly, each UE transmits and receives data in the following carriers.

UE1: data reception (DL anchor carrier) and data transmission (UL anchor carrier)
 UE2: data reception (DL non-anchor carrier) and data transmission (UL non-anchor carrier)
 UE3: data reception (DL non-anchor carrier) and data transmission (UL anchor carrier)

The NB-IoT UE is not capable of simultaneous transmission and reception, and a transmission/reception operation is limited to one band. Therefore, even though multiple carriers are configured, the UE requires only one transmission/reception chain in a 180-kHz band.

EMBODIMENT

Inter-Cell Interference Mitigation for NB-IoT

When the NB-IoT system operates in TDD, there is a need for a method of effectively using DL subframes and UL subframes during UL repeated transmissions and DL repeated transmissions. A method of reducing power consumption of a UE and effectively managing resources is also required. For this purpose, the present disclosure largely proposes (1) a UL/DL interlaced scheduling method, (2) a DL early termination method, (3) a UL early termination method, and (4) a switching time securing method.

The UL/DL interlaced scheduling method proposed in the present disclosure may be applied to a system supporting multiple repetitions of DL and UL transmissions/receptions. Particularly, the UL/DL interlaced scheduling method may be applied effectively, when DL and UL alternate during repeated transmissions/receptions. While the present disclosure is described in the context of an NB-IoT system conforming to 3GPP LTE Rel-13 and Rel-14, for the convenience of description, the description is also applicable to a system conforming to a subsequent release, a system requiring repeated transmissions as in eMTC, and other general systems. Further, although the present disclosure is effectively applicable to a case in which the amounts of DL and UL resources are different according to a UL/DL configuration as in TDD, the present disclosure may also be used, when DL resources and UL resources are not enough for repeated transmissions in a system operating in any other duplex mode.

In the following description, the NPDCCH may be replaced by the PDCCH or DL (physical) control channel, and the NPDSCH may be replaced by the PDSCH, DL (physical) shared channel, or DL (physical) data channel. The NPUSCH may be replaced by the PUSCH, UL (physical) shared channel, or UL (physical) data channel.

(1) UL/DL Interlaced Scheduling Method

In a TDD system, DL and UL alternate with each other every predetermined period in the time domain (e.g., every 5 ms or 10 ms in LTE). When a DL reception is not allowed before a UL transmission is completed, DL resources which appear every predetermined period may be wasted in a system characterized by repeated transmissions in one HARQ process, like NB-IoT. Resources may also be wasted when a UL transmission is not allowed before a DL reception is completed. To avert the problem, UL/DL interlaced scheduling methods are proposed, in which UL and DL alternate with each other, for transmission/reception.

[Method #1: Single DCI-based UL/DL scheduling]

To transmit UL data and receive DL data, a UE needs to receive a UL grant and a DL grant in DL resources (e.g., a DL subframe or slot). A system suffering from shortage of DL resources like a TDD system requires a method of including both a UL grant and a DL grant in one DCI, instead of independently transmitting the UL grant and the DL grant. For this purpose, a single DCI-based UL/DL scheduling method is proposed, and the DCI may need an additional field indicating "UL grant", "DL grant", or "UL/DL grant". The following may be considered.

A "DCI for simultaneous UL and DL scheduling" (hereinafter, referred to as a DL/UL joint DCI) and a "DCI for separate UL and DL scheduling" may be defined in different formats (e.g., payload sizes). The UE may not attempt to simultaneously detect the two DCI formats at a specific time.

When the "DCI for simultaneous UL and DL scheduling" and the "DCI for separate UL and DL scheduling" are defined in the same payload size, 2-bit flags identifying a format may be included in the DCIs.

A 1-bit flag may be defined as a "flag for differentiation between format N0 and format N1". The other 1-bit flag may be used to indicate a format for simultaneous UL and DL scheduling. DCI format N0 includes NPUSCH scheduling information, and DCI format N1 includes NPDSCH scheduling information. DCI format N0 and DCI format N1 are of the same payload size.

Values 0 to 3 represented in the 2 bits may indicate "DL scheduling", "UL scheduling", "UL/DL scheduling", and "DL/UL scheduling", respectively. UL/DL and DL/UL may be used to indicate which one of UL and DL immediately follows the DCI.

When UL and DL are simultaneously scheduled, a UL scheduling delay (i.e., a DCI-to-NPUSCH delay) and a DL ACK/NACK delay (i.e., an NPDSCH-to-ACK/NACK delay) may be derived from common delay information/value. That is, both the UL scheduling delay and the DL ACK/NACK delay may be set using one delay value, thereby effectively reducing a DCI payload size.

(Opt. 1) The single DCI (DL/UL joint DCI) may indicate only an NPUSCH scheduling delay (NPUSCH transmission timing), and an ACK/NACK for an NPDSCH may always be piggybacked to a corresponding NPUSCH. Whether to piggyback an ACK/NACK may be determined differently according to the number of remaining subframes (i.e., a remaining repetition number) of NPUSCH format 1 on the time axis after the NPDSCH is decoded. For example, when the remaining repetition number is not enough for repeated transmissions of the ACK/NACK, some of the ACK/NACK repeated transmissions may be piggybacked to the remaining NPUSCH format 1, while the remaining ACK/NACK repeated transmissions may be performed in NPUSCH format 2. When the remaining repetition number of NPUSCH format 1 is enough for repeated transmissions of the ACK/NACK, the ACK/NACK may be piggybacked to NPUSCH format 1, while NPUSCH format 1 may be transmitted without ACK/NACK piggyback during the remaining repeated transmission period of NPUSCH format 1.

(Opt. 2) The single DCI (DL/UL joint DCI) may indicate only a single delay value, and the delay value may be commonly applied to the ACK/NACK delay (NPDSCH-to-ACK/NACK delay) and the UL scheduling delay (DCI-to-NPUSCH delay). The common application of the single delay value may mean that (1) the same delay information is derived from the single delay value or (2) each piece of delay information is derived independently from the single delay value. In the case of (2), different pieces of delay information may be derived from the single delay value.

Figure 12:
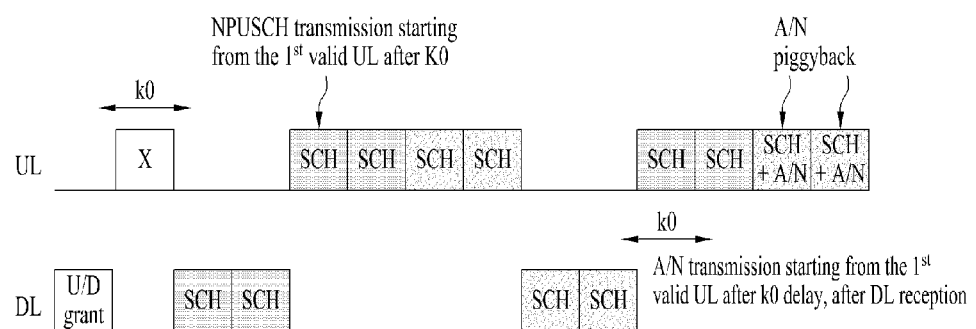
FIGS. 12 to 15 are diagrams illustrating signal transmission and reception according to the present disclosure.
Figure 13:
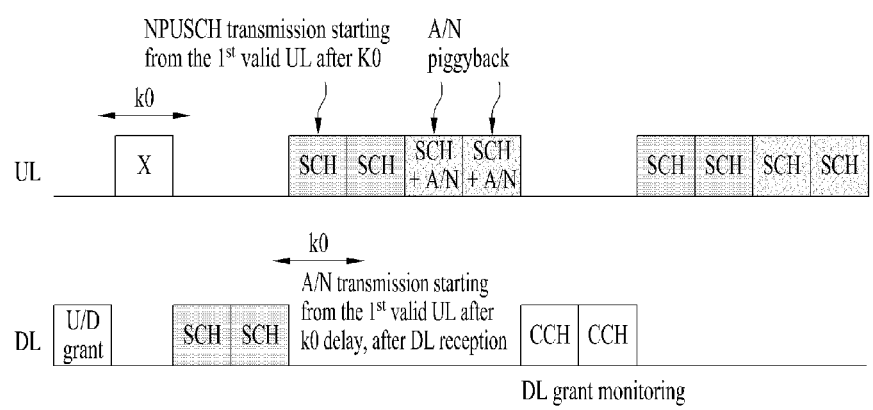
Figure 14:
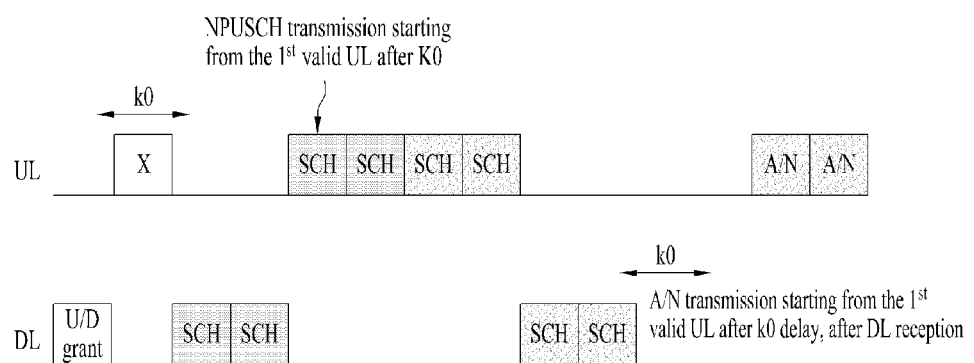

FIGS. 12, 13 and 14 illustrate exemplary signal transmissions according to Opt. 2. In FIGS. 12, 13 and 14, an SCH is an NPUSCH or NPDSCH according to resources (i.e., UL or DL resources), and a U/D grant (i.e., DL/UL joint DCI) schedules UL and DL by one NPDCCH. In FIGS. 12, 13 and 14, UL and DL may represent a UL carrier and a DL carrier, respectively, or UL resources (e.g., a UL subframe or slot) and DL resources (e.g., a DL subframe or slot) of the same carrier. Further, the U/D grant may imply that UL scheduling information and DL scheduling information are delivered on an NPDCCH at time points which are not overlapped. k0 may be indicated by the U/D grant and used as both of the NPDSCH-to-ACK/NACK delay and the DCI-to-NPUSCH delay. A/N represents ACK/NACK information for DL-SCH data (e.g., TB). DL-SCH data may be transmitted on an NPDSCH, and UL-SCH data may be transmitted on an NPUSCH. Different hatching on UL and DL implies changing of a scrambling sequence and/or a redundancy version during repeated transmissions of a physical channel.

Referring to FIGS. 12, 13 and 14, an ACK/NACK for a DL-SCH (e.g., NPDSCH) may be piggybacked to NPUSCH format 1 (FIGS. 12 and 13) or transmitted separately (FIG. 14) according to the presence or absence of a subframe of NPUSCH format 1 after an NPDSCH-to-ACK/NACK delay (e.g., k0) from a reception time of the last subframe of the DL-SCH. FIG. 12 illustrates a case in which UL-SCH (e.g., NPUSCH) subframes and DL-SCH subframes end at similar time points, and FIG. 13 illustrates a case in which UL-SCH subframes exist after the last subframe of a DL-SCH. In the illustrated case of FIG. 13, a DL grant may be monitored during transmission of the UL-SCH subframes. FIG. 14 illustrates a case in which there are no UL-SCH subframes after the last subframe of a DL-SCH.

[Method #2: Separate DCI-Based Independent UL and DL Scheduling]

When the UE is repeatedly transmitting UL data (the UE is repeatedly transmitting UL data in one UL HARQ process and all UL HARQ processes of the UE have been scheduled), the UE may monitor an NPDCCH in a DL subframe before the repeated transmissions of the UL data are completed (see FIG. 13). When all of the UL HARQ processes of the UE have been scheduled and thus UL transmissions are in progress in the UL HARQ processes, the UE may not expect new UL scheduling (during the UL transmissions). Accordingly, when all of the UL HARQ processes of the UE have been scheduled and thus UL transmissions are in progress in the UL HARQ processes, with some of DL HARQ processes not scheduled, the UE may expect that DCI of an NPDCCH monitored additionally in a DL subframe period during the repeated transmissions of UL data is for DL scheduling. The DCI which is expected to be for DL scheduling may be in a DL compact DCI format. After the repeated transmissions of UL data, the UE may normally monitor a DL grant DCI format and a UL grant DCI format.

The DL compact DCI format is a format with no possibility of being interpreted as a UL grant. For example, the DL compact DCI format may be DCI format N0/N1 without the "flag for differentiation between format N0/format N1". Conventionally, DCI format N0 and DCI format N1 are of the same payload size and distinguished from each other by a 1-bit flag for differentiation between format N0 and format N1.

When the UE is repeatedly receiving DL data (the UE is repeatedly receiving DL data in one DL HARQ process), the UE may monitor an NPDCCH in a specific DL subframe before the repeated receptions of the DL data are completed or when the repeated receptions of the DL data are completed and an ACK/NACK is yet to be reported. When all of the DL HARQ processes of the UE have been scheduled and thus DL receptions are in progress in the DL HARQ processes, the UE may not expect new DL scheduling (during the DL receptions). Accordingly, when all of the DL HARQ processes of the UE have been scheduled and thus DL receptions are in progress in the DL HARQ processes, with some of UL HARQ processes not scheduled, the UE may expect that DCI of an NPDCCH monitored additionally (in a specific DL subframe period) is for UL scheduling. The DCI which is expected to be for UL scheduling may be in a UL compact DCI format. The UL compact DCI may be used for UL early termination (e.g., refer to Methods #6, #7 and #8). When the repeated receptions of DL data are completed and an ACK/NACK for the DL data is reported, the UE may normally monitor a DL grant DCI format and a UL grant DCI format.

The UL compact DCI format is a format with no possibility of being interpreted as a DL grant. For example, the UL compact DCI format may be DCI format N0/N1 without the "flag for differentiation between format N0/format N1".

The UL compact DCI format may be a format designed to request reporting of an ACK/NACK for DL data which is being received. Upon receipt of the UL compact DCI format, the UE may report an ACK/NACK (or only when the ACK/NACK is an ACK) for DL data in indicated UL resources (e.g., an NPUSCH) before completely receiving the DL data as many times as a repetition number initially set for the DL data.

When the UE is repeatedly transmitting UL data (the UE is repeatedly transmitting UL data in one UL HARQ process and all UL HARQ processes of the UE have been scheduled), the UE may not monitor an NPDCCH in a DL subframe period (e.g., skip NPDCCH monitoring) when all of the DL HARQ processes of the UE have been scheduled or an ACK/NACK for DL data is yet to be reported.

[Method #3: Method of Configuring DCI Monitoring]

UL/DL interlaced scheduling is applicable only to a UE at or above (or at or below) a specific coverage enhancement (CE) level. Referring to 3GPP LTE Rel-14, a mobility management entity (MME) may define up to three CE levels, that is, CE level 0 to CE level 2. A message is transmitted repeatedly based on a CE level according to the location of a UE.

A UE below (or above) the specific CE level may not monitor an NPDCCH (e.g., skip NPDCCH monitoring) before a scheduled UL or DL HARQ process is completed.

However, a UE having two or more HARQ processes may monitor an NDPCCH even before the scheduled UL or DL HARQ processes are completed.

UL/DL interlaced scheduling is applicable only to an NPDCCH set to a specific Rmax value or less (or the Rmax value or greater). Rmax represents an NPDCCH repetition number.

In UL/DL interlaced scheduling, an NPUSCH and/or an NPDSCH may be scheduled only with a specific repetition number or greater (the specific repetition number or less).

Before as many NPUSCH transmissions as a configured repetition number are completed, NPDCCH monitoring may be performed in a specific DL subframe/slot period (e.g., see FIG. 13).

When the repeated NPUSCH transmissions take time longer than a predetermined time, the UE may attempt to detect an NPDCCH for a predetermined time in an NPDCCH monitoring carrier (see FIG. 11). The predetermined time may be a UL gap or a value allowed for tracking DL synchronization.

A UL grant which has indicated the NPUSCH transmissions may directly indicate a gap period for NPDCCH monitoring.

As described above, DL and UL subframes (slots) which alternate non-continuously on the time axis may be used effectively in UL/DL interlaced scheduling. However, UL/DL interlaced scheduling requires additional NPDCCH monitoring, resulting in consumption of more UE power. To mitigate this problem, the UE may expect UL/DL interlaced scheduling or perform additional NPDCCH monitoring, only under a specific condition. For example, only when the number of DL subframes between UL repeated transmissions is less than a specific value (or ratio) or is equal to or less than a maximum repetition number of the NPDCCH, the UE may expect/perform additional NPDCCH monitoring. Alternatively, when a repetition number for an NPUSCH is greater than a specific value, the UE may additionally monitor an NPDCCH in some time period, upon occurrence of a condition for postponing NPUSCH transmissions by the time period. This may be configured in consideration of a UL/DL switching gap of the UE. Further, a UL grant which has scheduled the NPUSCH may explicitly configure a specific time period during which an NPDCCH may be monitored during repeated NPUSCH transmissions.

(2) DL Early Termination Method

The measurement accuracy of an NB-IoT system operating in a narrowband and supporting a large max coupling loss (MCL) is lower than that of a system using a wideband. Therefore, an eNB may set an NPDSCH repetition number to too large a value based on an inaccurate measurement received from a UE. In this case, the UE may succeed in decoding an NPDSCH before receiving the NPDSCH as many times as the configured repetition number. To overcome this resource waste, there is a need for a method of reporting a DL ACK/NACK before repeated NPDSCH receptions are completed. Particularly when UL resources alternate with DL resources as in a TDD system, a method of fast reporting an ACK/NACK in UL resources existing between DL repeated receptions may be applied effectively.

[Method #4: Method of Configuring DL Early Termination]

When UL resources alternate with DL resources in the time domain, an ACK may be reported fast in UL resources between DL repeated receptions.

Before repeated receptions in a configured DL HARQ process are completed, a DL decoding result may be reported on UL only when the DL decoding result is an ACK.

A plurality of ACK/NACK reporting delays may be configured for a scheduled DL HARQ process by a DL grant.

Only when an ACK is generated during repeated NPDSCH receptions, the UE may report the ACK in ACK/NACK resources configured in UL resources (e.g., a UL subframe or slot) corresponding to an ACK/NACK reporting delay earlier than the longest ACK/NACK reporting delay.

When the UE has not reported the ACK before the longest ACK/NACK reporting delay, the UE may report the ACK or NACK in the last of configured ACK/NACK resources (i.e., ACK/NACK resources configured at the longest ACK/NACK reporting delay).

When the UE has reported the ACK before the longest ACK/NACK reporting delay but has not received an indication indicating transmission discontinuation for the corresponding DL HARQ process explicitly/implicitly, the UE may report the ACK or NACK in the last of the configured ACK/NACK resources.

For example, when scheduling an NPDSCH by a DL grant, the eNB may configure a plurality of DL ACK/NACK reporting resources. Each of the DL ACK/NACK reporting resources may correspond to an ACK/NACK reporting delay. Let the plurality of DL ACK/NACK reporting resources be denoted sequentially by 1 to N (N>1). Then, ACK/NACK resource 1 to ACK/NACK resource N-1 may be used only when the decoding result of the NPDSCH being received is an ACK. When the UE has not reported an ACK in ACK/NACK resource 1 to ACK/NACK resource N-1 or when the UE has reported an ACK in ACK/NACK resource 1 to ACK/NACK resource N-1 but the eNB has not indicated discontinuation of a corresponding DL HARQ process explicitly or implicitly, the UE may report an ACK or NACK in ACK/NACK resource N. ACK/NACK resource N corresponds to the longest ACK/NACK reporting delay.

Case in which an ACK occurs before DL repeated receptions are completed and a UL data transmission has been scheduled.

When a transmission in NPUSCH format 1 is in progress along with repeated NPDSCH receptions, upon generation of an ACK as an NPDSCH decoding result, the UE may transmit the ACK in NPUSCH format 2, discontinuing the transmission of NPUSCH format 1 for a specific time period.

The ACK may be in NPUSCH format 1 which is being transmitted. Data at the position of the ACK in NPUSCH format 1 may be punctured. A NACK may not be piggybacked to NPUSCH format 1.

[Method #5: Method of Simultaneously Transmitting ACK/NACK and UL Data]

An ACK/NACK and UL data may be multiplexed (ACK/NACK piggyback).

When the number of tones in NPUSCH format 1 for UL data transmission is less than the number of tones (12 tones) in one RB, NPUSCH format 1 and NPUSCH format 2 for ACK/NACK reporting may be multiplexed in FDM.

The ACK/NACK may be mapped to OFDM symbols at both sides of a DMRS in NPUSCH format 1, and data of NPUSCH format 1 at both sides of the DMRS may be punctured.

The ACK/NACK may be transmitted by skipping a part of repeated transmissions of NPUSCH format 1.

When the number of tones in NPUSCH format 1 is less than the number of tones in one RB, resources available for piggyback of the ACK (or ACK/NACK) are multiplexed in FDM with data resources to which the ACK (or ACK/NACK) is not piggybacked so that the eNB may distinguish the ACK (or ACK/NACK) from data.

It may be allowed to transmit NPUSCH format 1 to which the ACK/NACK is piggybacked with higher power than NPUSCH format 1 to which the ACK/NACK is not piggybacked.

The ACK/NACK and the UL data may be transmitted separately.

A DL grant-to-ACK/NACK delay and a UL grant-to-NPUSCH format 1 scheduling delay may be set to one value. After the scheduling delay, repeated transmissions of NPUSCH format 2 for ACK/NACK reporting may start, followed successively by a transmission of NPUSCH format 1. That is, NPUSCH format 1 and NPUSCH format 2 for ACK/NACK reporting may be multiplexed in TDM.

The ACK/NACK may be transmitted in a special subframe.

A DL grant may configure a plurality of ACK/NACK reporting delays for a corresponding DL HARQ process. Only when an ACK is generated during repeated NPDSCH receptions, the UE may report the ACK in ACK/NACK resources allocated for an ACK/NACK reporting delay earlier than the longest ACK/NACK reporting delay. When the UE has not reported an ACK before the longest ACK/NACK reporting delay, the UE may always report an ACK or NACK in the last of configured ACK/NACK resources (i.e., ACK/NACK resources configured in UL resources (e.g., subframe or slot) corresponding to the longest ACK/NACK reporting delay).

(3) UL Early Termination Method

The measurement accuracy of an NB-IoT system operating in a narrowband and supporting a large MCL is lower than that of a system using a wideband. Therefore, the eNB may set an NPUSCH repetition number to too large a value based on an inaccurate measurement received from the UE. Therefore, the eNB may succeed in decoding an NPUSCH before receiving the NPUSCH as many times as the configured repetition number. In this case, use of unnecessary UL resources may be reduced and unnecessary power consumption of the UE may be prevented, by fast feeding back an ACK for the UL data on DL.

[Method #6: Method of Configuring UL Early Termination]

Before repeated NPUSCH transmissions are completed, NPDCCH monitoring may be performed in a DL subframe period.

An explicit ACK channel may be monitored. A NACK may not be transmitted separately before the repeated NPUSCH transmissions are completed.

An ACK report may be received implicitly by monitoring a UL grant. For example, when a new UL grant is configured for a UL HARQ process in which the transmissions are in progress, the UE may interpret that an ACK has been received for the UL HARQ process.

NPDCCH DCI that the UE monitors before as many NPUSCH transmissions as an indicated repetition number are not completed may be UL compact DCI designed for UL early termination. For example, the UE may attempt blind decoding only for the UL compact DCI designed for UL early termination. A maximum repetition number for the UL compact DCI may be less than a maximum repetition number for (normal) DCI for a UL grant.

An ACK report may be received implicitly by monitoring a DL grant. For example, upon receipt of a DL grant 1)

before the UL transmissions are completed or 2) when the UL transmissions have been completed but ACK/NACK information for the corresponding UL HARQ process has not been received, the UE may interpret that an ACK has been received for the UL HARQ process for which the transmissions are in progress.

When repeated NPUSCH transmissions do not satisfy a specific condition, the UE may not attempt NPDCCH monitoring for UL early termination. This is because monitoring an NPDCCH in a DL subframe between repeated NPUSCH transmissions at all times at the UE may cause unnecessary power consumption. Accordingly, when there is a very low probability that an ACK results from decoding the NPUSCH which is being repeatedly transmitted, NPDCCH monitoring for UL early termination may be skipped. For example, the specific condition is given as follows.

A predetermined ratio or more of as many repeated NPUSCH transmissions as an NPUSCH repetition number indicated by a UL grant have not been completed.

A DL subframe period available for NPDCCH monitoring between repeated NPUSCH transmissions is shorter than a predetermined value (i.e., the number of DL subframes available for an ACK feedback for UL early termination is less than a predetermined value).

The NUPUSCH repetition number indicated by the UL grant is less than a specific value.

An NPDSCH is interlaced-scheduled and thus NPUSCH transmissions and NPDSCH receptions are interlaced. That is, when UL data and DL data are being transmitted and received through interlaced scheduling, an NPDSCH reception may be performed with priority over NPDCCH monitoring in a DL subframe period between repeated NPUSCH transmissions.

[Method #7: Method of Monitoring Explicit ACK/NACK During UL Transmissions]

An ACK for a UL HARQ process may be transmitted in a DL subframe apart from an NPUSCH transmission time by a predetermined time interval. A NACK may not be transmitted separately. An ACK/NACK channel monitored during repeated NPUSCH transmissions, for UL early termination may be designed to be an explicit ACK channel (synchronous ACK/NACK). The explicit ACK channel may be designed to always carry an ACK report in DL resources/period placed in a specific relationship with NPUSCH transmission resources. For example, the specific relationship may be established between resources (e.g., transmission time/frequency tones) of the explicit ACK channel and the starting subframe (or slot) and/or the positions/number of tones and/or a repetition number of NPUSCH format 1 carrying data for a UL HARQ process, and the resources for the explicit ACK channel may be reserved accordingly. Therefore, the UE may monitor an ACK for the UL HARQ process in specific preset DL resources during transmissions of NPUSCH format 1. When the UE fails in detecting the ACK, the UE may continue transmitting ongoing NPUSCH format 1.

[Method #8: Method of Monitoring Implicit ACK/NACK (DCI) During UL Transmissions]

When a new data indicator (NDI) for a UL HARQ process of NPUSCH format 1 being transmitted is toggled and indicates an ACK implicitly, it may be indicated separately whether a new data transmission is to be skipped. According to the implicit ACK/NACK method, toggling an NDI (UL grant) for a UL HARQ process for which transmissions have been completed or are in progress is interpreted as an ACK/NACK for UL data. When the NDI for the UL HARQ process is toggled, the NDI may indicate/be interpreted as transmission of new data in the UL HARQ process, and when the NDI for the UL HARQ process is not toggled, the NDI may indicate/be interpreted as retransmission or continuous transmission in the UL HARQ process for which transmissions have been completed or are in progress. When an ACK has been generated for the UL HARQ process or a new data transmission in the UL HARQ process is not needed, there is no way for UL early termination or its effect may be mitigated. That is, because the HARQ-ACK feedback is interpreted as an ACK, the UE may discontinue data transmission in the UL HARQ process. However, the UE should start a new transmission irrespective of whether new transmission data exists. To avert this problem, a UL grant may explicitly indicate whether a new data transmission is to be skipped, along with an NDI for a UL HARQ process.

Even though an NDI for a UL HARQ process is toggled in a received new UL grant before as many NPUSCH transmissions as an NPUSCH repetition number indicated by a UL grant are completed, a new data transmission in the UL HARQ process may be skipped. For example, when an NDI for a UL HARQ process for which transmissions are in progress is toggled in a new UL grant before all of repeated NPUSCH transmissions indicated by a UL grant are completed, the UE may discontinue an ongoing transmission of NPUSCH format 1 without transmitting new data for a time period corresponding to the remainder of a previously configured NPUSCH format 1 repetition number.

(4) Method of Securing a Time Gap for Transceiver Switching (DL-to-UL Switching and UL-to-DL Switching) Between UL and DL Interlaces In general, a transceiver switching time for DL-to-UL switching and UL-to-DL switching is required. When the transceiver switching time is not secured, a constraint may be imposed on use of the last period of a preceding (physical) channel and/or the starting period of a following (physical) channel in UL-to-DL or DL-to-UL interlaced transmission/reception. To solve the problem, a method of securing a time gap is required. However, the method of securing a time gap may be applied differently according to an operation mode or the like. Further, when a time (i.e., a time period in which a UE does not expect a DL signal reception or is not allowed to transmit a UL signal) used to secure a time gap corresponds to part of a TTI or a basic unit time (e.g., a subframe or slot) used to fully transmit one physical channel, various methods of configuring a channel of a time period in which a transmission is allowed or a reception may be expected within a basic time unit are available. For example, a signal in a time period used as a time gap may be ignored or a transmission/reception channel may be rate-matched differently in consideration of a time gap.

[Method #9: Method of Securing a Time Gap for Transceiver Switching (DL-to-UL Switching and UL-to-DL Switching) Between UL and DL Interlaces]

Interlaced scheduling and transmission/reception of interlaced channels may need a different time gap according to an operation mode.

In-band operation mode.

There may be no need for an explicit time gap between an NPDCCH/NPDSCH reception and an NPUSCH transmission. Therefore, no time gap may be defined between an NPDCCH/NPDSCH reception and an NPUSCH transmission. Instead, a 'GP+UpPTS' period included a special subframe between a DL subframe and a UL subframe may be used as a guard time for a time gap (see FIG. 2(b)). Alternatively, the DwPTS of a special subframe immediately before the NPUSCH transmission may be configured such that the UE is not allowed to receive an NPDCCH/

NPDSCH in the DwPTS. This may be different according to the length of the DwPTS. Further, the non-received NPDCCH/NPDSCH in the DwPTS period may not be counted in a total repetition number.

An explicit time gap may not be needed between an NPUSCH transmission and an NPDCCH/NPDSCH reception. Therefore, no explicit time gap may not be defined between an NPUSCH transmission and an NPDCCH/NPDSCH reception. Instead, the control area (see FIG. 4) of the first ($1^{st}$) DL subframe in which the DL signal is received (immediately) after the UL transmission may be used as a guard time for a time gap. Information about the size (e.g., the number of symbols) of the control area of the DL subframe may be transmitted in an NB-IoT SIB. When the size of the control area of the first DL subframe in which the DL signal is received (immediately) after the UL transmission is not enough for accommodating the guard time, the size of the control area of the first DL subframe may be set to a value larger than the value set in the NB-IoT SIB. That is, when a UL/DL interlacing operation is performed, the UE may interpret the size of the control area of the first DL subframe in which the DL signal is received (immediately) after the UL transmission as different from (e.g., larger than) the value broadcast in the SIB. However, the size of the control area in the other DL subframes except for the first DL subframe may be interpreted as equal to the value broadcast in the SIB.

Guard-band and stand-alone operation modes.

There may be no need for an explicit time gap between an NPDCCH/NPDSCH reception and an NPUSCH transmission. Therefore, no explicit time gap may be defined between an NPUSCH transmission and an NPDCCH/NPDSCH reception. Instead, a 'GP+UpPTS' period included in a special subframe between a DL subframe and a UL subframe may be used as a guard time for a time gap. Therefore, even when the UpPTS is available for the NPUSCH transmission, the UpPTS of the special subframe following the DL reception may not be used. That is, the UE may determine/interpret differently whether to use the UpPTS of a special subframe for an NPUSCH transmission, depending on whether UL/DL interlacing is applied/performed. That is, when UL/DL interlacing is applied/performed, even though the UpPTS is available for the NPUSCH transmission, the UpPTS of the special subframe following the DL reception may not be used. When UL/DL interlacing is not applied/performed and the UpPTS is available for the NPUSCH transmission, the UpPTS of the special subframe following the DL reception may be used for the NPUSCH transmission.

In another method, an explicit time gap may be defined between an NPUSCH transmission and an NPDCCH/NPDSCH reception. For this purpose, a specific subframe or slot may be allocated fully as a guard time, or a virtual control area may be configured and used as a guard time. When a specific subframe or slot is allocated as a guard time, a constraint may be imposed on use of a successive DL subframe (immediately) after a UL subframe depending on whether UL/DL interlacing is applied/performed. When a virtual control area is used as a guard time, the number of OFDM symbols in the control area may be any non-zero value. That is, although the number of symbols in a control area is assumed to be zero in the guard-band and stand-alone modes, when UL/DL interlacing is applied/performed, the UE may be configured not to expect reception of a DL signal (e.g., NPDCCH/NPDSCH) during the corresponding time period by setting the size of the control area in the first ($1^{st}$) DL subframe or a successive DL subframe (immediately) after a UL transmission (e.g., NPUSCH) to a value larger than zero. Accordingly, the UE may skip the DL signal (e.g., NPDCCH/NPDSCH) reception at the start of the first ($1^{st}$) DL subframe (immediately) after the UL transmission (e.g., NPUSCH). The guard time for switching may be understood as an implicit gap in the sense that a specific number of symbols (e.g., corresponding to a specific size of a control area in the foregoing example) between an NPUSCH transmission and an NPDCCH/NPDSCH reception are always not used. For example, when the operation mode is the guard-band or stand-alone mode, the number of symbols for transceiver switching may not be signaled independently but assumed to be a specific value. Therefore, the UE may skip a DL signal (e.g., NPDCCH/NPDSCH) reception at the start of the first ($1^{st}$) DL subframe (or successive DL subframe) (immediately) after a UL transmission (e.g., NPUSCH).

Figure 15:
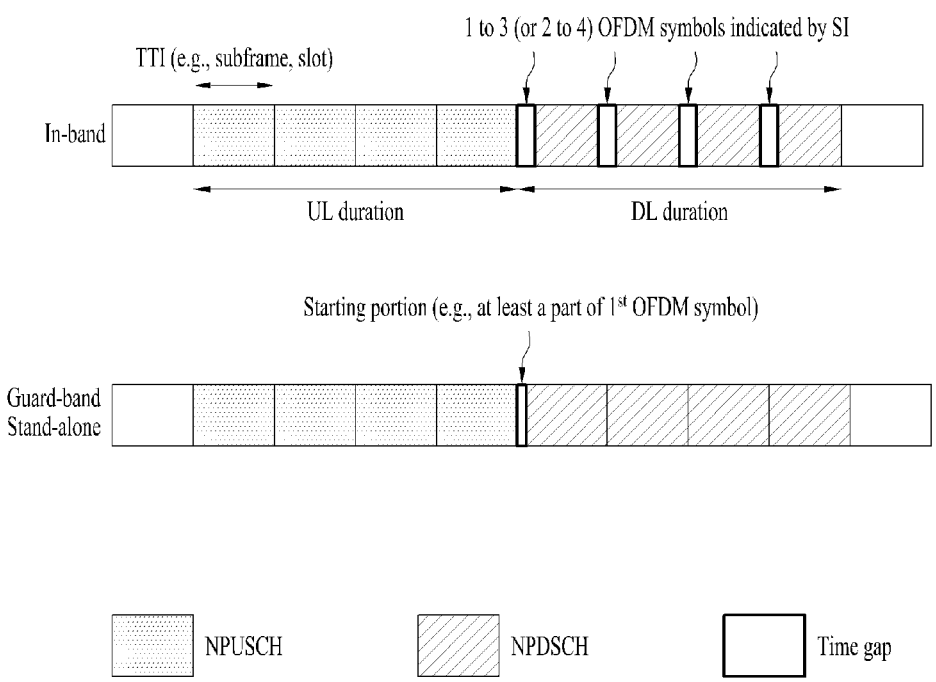

FIG. 15 is a diagram illustrating exemplary DL signal receptions according to the present disclosure.

Referring to FIG. 15, a UE (e.g., NB-IoT UE) may transmit a PUSCH repeatedly in a UL period (or duration). The UL period may include a plurality of time units (e.g., TTIs, subframes, or slots), and each PUSCH may be transmitted in a corresponding time unit of the UL period. The UE may then be scheduled to repeatedly receive a PDSCH in a DL period (or duration) immediately after the repeated PUSCH transmissions. The DL period may also include a plurality of time units (e.g., TTIs, subframes, or slots), and each PDSCH may be transmitted in a corresponding time unit of the DL period. When the UE operates in the in-band mode, the UE may start to receive each PDSCH in an OFDM symbol after a $k^{th}$ OFDM symbol in a corresponding time unit of the DL period. Herein, k is an integer larger than 1 and may be received in system information (SI) (e.g., an NB-IoT SIB).

When the UE operates in the guard-band or stand-alone mode, the UE may skip a signal reception (operation) at the start of the DL period during repeated PDSCH receptions. For example, for the first (Pt) PDSCH, a signal reception (operation) may be skipped in at least part of the first OFDM symbol of a corresponding time unit. Reception of each of the second and subsequent PDSCHs may start in the first ($1^{st}$) symbol of a corresponding time unit.

The repeated PUSCH transmissions and the repeated PDSCH receptions may be performed in TDM in the same carrier. A UL/DL resource configuration for the carrier may be indicated by a UL/DL configuration listed in Table 1. In NB-IoT, the PUSCH may include the NPUSCH, and the PDSCH may include the NPDSCH. An SCS used for the (N)PDSCH transmissions may be 15 kHz. Further, the wireless communication system may include a 3GPP-based wireless communication system.

In the above methods, a guard time period (e.g., subframe, slot, symbol(s), part of a symbol) for transceiver switching may be punctured or rate-matched.

The punctured time period may be the first ($1^{st}$) symbol of the UL period, the last symbol of the UL period, the first symbol of the DL period, the last symbol of the DL period, or a UL and DL combination of the above periods. The punctured time period may vary depending on whether the punctured time period includes an RS.

In the above methods, when the UE receives a DL signal (e.g., NPDCCH/NPDSCH) immediately after a UL transmission (e.g., an NPUSCH transmission), the UE may not receive the DL signal (i.e., the UE may skip the NPDCCH/NPDSCH reception) in the first ($1^{st}$) OFDM symbol (i.e., the first OFDM symbol of a DL subframe (immediately) after a UL subframe) (or at least part of the first ($1^{st}$) OFDM symbol) of the DL period, although the eNB actually transmits the first ($1^{st}$) OFDM symbol (i.e., the first ($1^{st}$) OFDM symbol of the DL subframe). That is, the UE may interpret the OFDM symbol as punctured. However, the eNB may transmit the OFDM symbol without puncturing it to UEs for which UL/DL interlacing is not performed, much transceiver switching time is not required, or a sufficient transceiver switching time is given by an offset as long as a timing advance (TA) of a UL transmission channel. When a time gap is generated between a UL transmission and a DL reception immediately after the UL transmission due to a UL or DL invalid subframe, no transceiver switching time may be needed. In this case, the UE may normally receive the first ($1^{st}$) OFDM symbol of the DL period (shortly after the UL transmission).

When a guard time is included in subframes for which repeated transmissions are configured, data of a transmission channel may be rate-matched or punctured according to a repetition number for the transmission channel in a transmission period except for the guard time in the subframes. For example, when the repetition number is less than a predetermined value, the data may be rate-matched in consideration of resources (e.g., REs) of the remaining time period except for the guard time. When the repetition number is larger than the predetermined value, the guard time may be punctured, while rate matching may not be applied to the remaining time period except for the guard time. Because the repetition number of the transmission channel is large in a low signal-to-noise (SNR) environment, the same mapping between repeated transmissions (i.e., mapping of the same information to the same REs between repeated transmissions by puncturing) may be more effective than a coding gain based on rate-matching.

A time period used to secure a transceiver switching time and an interlacing scheduling constraint or a transmission/reception constraint may be different according to the operation mode of a carrier. A time for frequency retuning may be different according to the operation mode of the carrier used after the frequency retuning. For example, in frequency retuning from a UL carrier to a DL carrier, when the DL carrier is in the in-band operation mode, a gap of 1 ms may not be needed. Even in this case, the UE may not expect to receive some first ($1^{st}$) symbols of an NB-IoT channel (e.g., the first ($1^{st}$) OFDM symbol after a CFI of a legacy LTE UE, configured for an NB-IoT UE by system information) or part of the first ($1^{st}$) symbol, within 1 ms. When the DL carrier is in the guard-band or stand-along operation mode, the UE may not expect the NB-IoT channel for the first 1 ms or the duration of a slot. That is, a specific method of ensuring a frequency retuning time may be different depending on whether a time period during which reception of an NB-IoT channel/signal may not be expected is included in the frequency retuning time.

A time period used to secure a transceiver switching time and an interlacing scheduling constraint or a transmission/reception constraint may be different depending on whether a carrier is an anchor carrier or a non-anchor carrier. For example, in frequency retuning from a UL carrier to a DL carrier, when the DL carrier is a non-anchor carrier, a gap of 1 ms may not be needed. Even in this case, the UE may not expect to receive some first ($1^{st}$) symbols of an NB-IoT channel (e.g., the first OFDM symbol after a CFI of a legacy LTE UE, configured for an NB-IoT UE by system information) or part of the first ($1^{st}$) symbol, within 1 ms, thereby defining no explicit guard time. When the DL carrier is an anchor carrier, an explicit guard time may be defined such that the UE does not expect the NB-IoT channel for the first 1 ms or the duration of a slot.

A time period used to secure a transceiver switching time and an interlacing scheduling constraint or a transmission/reception constraint may be different depending on whether a guard time period required for UL-to-DL switching includes a valid or invalid subframe.

A time period used to secure a transceiver switching time and an interlacing scheduling constraint or a transmission/reception constraint may be different depending on whether a TA is applied to a UL channel transmitted by a UE in the UL period of a UL-to-DL period. For example, when an NPRACH is transmitted, a TA is not applied, thus imposing a constraint on use of a following DL subframe, for a transceiver switching gap of the UL-to-DL period. That is, it may be necessary to limit use of some DL OFDM symbol or subframe (e.g., 1 ms) (by puncturing or rate-matching). Further, a required DL restriction period may vary according to an NPRACH format transmitted by the UE. For example, the DL restriction period may be set to a different value (e.g., a period subjected to puncturing or rate-matching) depending on whether the NPRACH transmitted by the UE is based on an NPDCCH order, transmitted in RRC_CONNECTED mode, contention-based, or contention-free-based. It may be defined that a UE receives a DL channel/signal following an NPUSCH transmission to which a TA is applied. Obviously, a specific condition for receiving a DL channel/signal may be defined according to the above-described conditions (operation mode, anchor/non-anchor carrier, and valid/invalid subframe).

It may be defined that Method #9 is not applied in a situation in which Method #10 is applied or npusch-AllSymbols and srs-SubframeConfig are configured to avoid an SRS transmission from a legacy LTE UE. For example, when a UE transmits a UL signal in a UL valid subframe immediately before reception of a DL valid subframe and skipping of transmission of (one or more) last symbols is indicated, Method #9 may not be applied. Herein, a DL valid subframe refers to a subframe available for an NPDCCH or NPDSCH transmission, and a UL valid subframe refers to a subframe available for an NPUSCH transmission. Accordingly, for example, in the illustrated case of FIG. 15, when the UE transmits an NPUSCH in a UL subframe immediately before a subframe carrying an NPDSCH (i.e., in a subframe in which a fourth NPUSCH transmission is performed), skipping of transmission of (one or more) last symbols may be indicated/configured. In the in-band operation mode, the UE operates in the manner illustrated in FIG. 15. In the guard-band/stand-along operation mode, the UE does not skip a signal reception (operation) at the start of the DL subframe immediately after the subframe carrying an NPUSCH. That is, the UE may start to receive the NPDSCH signal in the first ($1^{st}$) symbol of the DL subframe shortly after the subframe carrying the NPUSCH.

Method #10: Method of Securing a Time Gap for Transceiver Switching (DL-to-UL Switching and UL-to-DL Switching) and/or an RF Switching Gap by Using an SRS Period Configuration In addition to a method of configuring an implicit time gap for a transceiver switching gap and an RF switching gap, a method of securing a switching gap by configuring an SRS transmission period may be available. In Method #9, a UE is not allowed to receive part of a DL signal after switching and transition. In contrast, in the method of securing a switching gap by using an SRS transmission period, a time gap is secured by allowing/configuring a UE not to transmit part of a UL signal before switching.

Table 7 illustrates an example of configuring npusch-AllSymbols and srs-SubframeConfig to avoid an SRS transmission from a legacy LTE UE.

TABLE 7

When higher layer parameter npusch-AllSymbols is set to false, resource elements in SC-FDMA symbols overlapping with a symbol configured with SRS according to srs-SubframeConfig shall be counted in the NPUSCH mapping but not used for transmission of the NPUSCH. When higher layer parameter npusch-AllSymbols is set to true, all symbols are transmitted When npusch-AllSymbols is set to false, a UE does not use a specific UL subframe/symbol period configured as SRS resources during an NPUSCH transmission. srs-SubframeConfig indicates a subframe periodicity/offset used to define a subframe set configured with an SRS transmission. Although the method described in Table 7 is intended to protect an SRS transmission of a legacy UE, the method may be used for another purpose, that is, for the purpose of using a switching time for an NB-IoT UE. To this end, the definition and value of srs-SubframeConfig may be changed.

In another example, it may be defined that a UL-to-DL switching gap is secured, for example, by using only npusch-AllSymbols or its similar information without directly using srs-SubframeConfig. For example, when npusch-AllSymbols (or a similar parameter, that is, a parameter indicating non-transmission of the last symbol of an NPUSCH, the last symbol of a successive UL valid subframe, or the last symbol of a UL valid subframe in a period in which the UL valid subframe is adjacent to a DL valid subframe) is set to false, this may indicate skipping of transmission of the last symbol of the UL valid subframe. The proposed interpretation/indication may be limited to the followings. The followings may be combined.

The proposed interpretation/indication may be applied only to a UE for which UL/DL interlacing is configured or performed. That is, even when corresponding information is configured commonly within a cell, only UEs configured to perform a UL/DL interlacing operation may skip transmission of the corresponding UL last symbol.

The proposed interpretation/indication may be applied only when a UL valid subframe is adjacent to a DL valid subframe. That is, only when there is no gap between a UL valid subframe and a DL valid subframe, or the number of symbols in the control area of a DL valid subframe after a UL valid subframe is 'zero' or less than a specific value, UEs may skip transmission of the corresponding last symbol. Even though a valid UL subframe and a valid DL subframe are successive, when there is a period during which a UE expects to perform no reception in the first (adjacent) DL valid subframe shortly after a UL transmission (and the size of the period is larger than a predetermined value), the operation of skipping transmission of a last UL symbol may not be performed. For example, when a gap of 1 ms or longer is configured in an NPDCCH monitoring period after an NPUSCH format 2 transmission, or there is a period in which a UE is not allowed to receive a signal in a valid DL subframe shortly after a UL transmission, the operation of skipping transmission of a last UL symbol may not be performed.

The proposed interpretation/indication may be applied differently according to an NB-IoT operation mode. For example, because the control area of a subframe may be used for a UL-to-DL gap in the in-band operation mode, the operation of skipping transmission of a last UL symbol may not be performed. Therefore, the operation of skipping transmission of a last UL symbol may be performed only in the guard-band/stand-alone operation mode.

Further, when Method #9 is applied, Method #10 may not be configured or the operation of Method #10 may be skipped.

The proposed Method #9 and Method #10 may be used to secure a transceiver switching gap and, when an NB-IoT/eMTC relay is introduced, to mitigate interference between links/channels of a BS and a relay, a relay and a UE, and a relay and a relay. That is, when a relay communicates with 1) a BS, 2) a UE serviced by the relay, or 3) a relay at the next hop, by time division, time gaps may be required among the periods of 1), 2) and 3) and the proposed Method #9 and Method #10 may be used to secure the time gaps.

The UL/DL interlaced scheduling method proposed in the present disclosure may correspond to a UE capability, for example, relate to the number of HARQ processes. That is, a UE supporting only single-HARQ may not expect interlaced scheduling. However, a throughput may be more improved by interlaced scheduling than by 2-HARQ, according to a UL/DL configuration in a TDD system. Therefore, the UE supporting only single-HARQ may also indicate support of interlaced scheduling by a separate capability signal. Further, interlaced scheduling may be supported in a manner satisfying a specific method or a specific condition in consideration of the complexity of a buffer/memory of the UE (when a soft buffer of a receiver and a soft-buffer of a transmitter are shared). Only when the specific method or the specific condition is satisfied, the eNB may perform interlaced scheduling. For example, the eNB may perform interlaced scheduling such that an NPDSCH to be scheduled for a UE and an NPUSCH to be scheduled on UL do not exceed a specific memory size (e.g., a reference memory size set based on a single-HARQ buffer or a reference memory size set based on a 2-HARQ buffer, in consideration of the HARQ process capability of the UE). When the NPDSCH is scheduled earlier than the NPUSCH, and then the NPUSCH is scheduled in a situation in which an ACK/NACK for the NPDSCH has not been received or detected, an NPUSCH which may use only the remaining buffer/memory space may be scheduled, on the assumption that the scheduled NPDSCH is all present in the buffer/memory of the UE. Herein, the reception soft buffer of the UE may calculate the number of bits in which an LLR is represented per information bit by using a specific value indicated by the eNB or defined in the standards. When the UE receives interleaved scheduling that does not satisfy that, the whole or part of the buffer may be overwritten with newly received or transmitted information, or belated received interleaved scheduling may be ignored.

Figure 16:
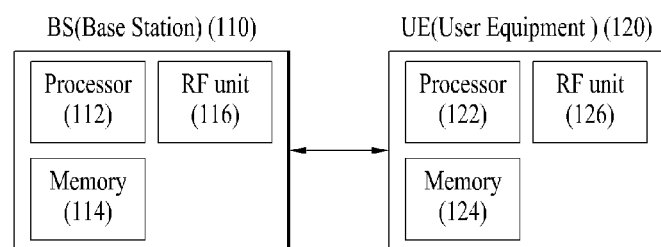
FIG. 16 is a block diagram illustrating a base station (BS) and a user equipment (UE) applicable to the present disclosure.

FIG. 16 illustrates a BS and a UE of a wireless communication system, which are applicable to embodiments of the present disclosure.

Referring to FIG. 16, the wireless communication system includes a BS 110 and a UE 120. When the wireless communication system includes a relay, the BS or UE may be replaced by the relay.

The BS 110 includes a processor 112, a memory 114 and a radio frequency (RF) unit 116. The processor 112 may be configured to implement the procedures and/or methods proposed by the present disclosure. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present disclosure. The memory 124 is connected to the processor 122 and stores information related to operations of the processor 122. The RF unit 126 is connected to the processor 122 and transmits and/or receives an RF signal.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present disclosure may be achieved by various means, for example, hardware, firmware, software, or a combination thereof. In a hardware configuration, the methods according to the embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present disclosure may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure is applicable to UEs, eNBs or other apparatuses of a wireless mobile communication system.

What is claimed is:

1. A method of receiving a signal by a user equipment (UE) in a time-domain duplexing (TDD)-based wireless communication system, the method comprising:
    detecting a narrowband physical downlink control channel (NPDCCH); and
    based on the detection of the NPDCCH, performing a narrowband physical downlink shared channel (NPDSCH) reception in plural downlink subframes on a carrier, wherein a starting downlink subframe of the plural downlink subframes immediately follows an uplink subframe,
    wherein, based on the carrier being in a guard-band or stand-alone mode, the NPDSCH reception is performed, without skipping any part of the NPDSCH reception in each of the plural downlink subframes, except the starting subframe where a starting part of the NPDSCH reception is skipped.

2. The method according to claim 1, wherein, based on the carrier being in an in-band mode, the NPDSCH reception is performed starting from $k^{th}$ (k>1) orthogonal frequency division multiplexing (OFDM) symbol in each of the plural downlink subframes, without skipping any part of the NPDSCH reception.

3. The method according to claim 1, wherein the UE includes a narrowband Internet of things (NB-IoT) UE.

4. The method according to claim 1, wherein, based on the carrier being in the guard-band or stand-alone mode, the NPDSCH reception is skipped in at least part of $1^{st}$ OFDM symbol of the starting downlink subframe.

5. The method according to claim 4, wherein, based on the carrier being in the guard-band or stand-alone mode, a NPDSCH related to the NPDSCH reception is placed starting from $1^{st}$ OFDM symbol of each of the plural downlink subframes.

6. The method according to claim 1, wherein a subcarrier spacing used for the NPDSCH is 15 kHz.

7. The method according to claim 1, wherein the wireless communication system includes a 3rd party partnership project (3GPP)-based wireless communication system.

8. A user equipment (UE) in a time-domain duplexing (TDD)-based wireless communication system, the UE comprising:
    a radio frequency (RF) module; and
    a processor,
    wherein the processor is configured to detect a narrowband physical downlink control channel (NPDCCH), and, based on the detection of the NPDCCH, perform a narrowband physical downlink shared channel (NPDSCH) reception in plural downlink subframes on a carrier, wherein a starting downlink subframe of the plural downlink subframes immediately follows an uplink subframe,
    wherein, based on the carrier being in a guard-band or stand-alone mode, the NPDSCH reception is performed, without skipping any part of the NPDSCH reception in each of the plural downlink subframes, except the starting downlink subframe where a starting part of the NPDSCH reception is skipped.

9. The UE according to claim 8, wherein, based on the carrier being in an in-band mode, the NPDSCH reception is performed starting from $k^{th}$ (k>1) orthogonal frequency division multiplexing (OFDM) symbol in each of the plural downlink subframes, without skipping any part of the NPDSCH reception.

10. The UE according to claim 8, wherein the UE includes a narrowband Internet of things (NB-IoT) UE.

11. The UE according to claim 8, wherein, based on the carrier being in the guard-band or stand-alone mode, the NPDSCH reception is skipped in at least part of $1^{st}$ OFDM symbol of the starting downlink subframe.

12. The UE according to claim 11, wherein, based on the carrier being in the guard-band or stand-alone mode, a NPDSCH related to the NPDSCH reception is placed starting from $1^{st}$ OFDM symbol of each of the plural downlink subframes.

13. The UE according to claim 8, wherein a subcarrier spacing used for the NPDSCH is 15 kHz.

14. The UE according to claim 8, wherein the wireless communication system includes a 3rd party partnership project (3GPP)-based wireless communication system.

\* \* \* \* \*